(12) United States Patent
Kurokawa et al.

(10) Patent No.: US 10,403,318 B2
(45) Date of Patent: *Sep. 3, 2019

(54) MAGNETIC TAPE HAVING CHARACTERIZED BACK COATING LAYER

(71) Applicant: FUJIFILM Corporation, Tokyo (JP)

(72) Inventors: Takuto Kurokawa, Minami-ashigara (JP); Eiki Ozawa, Minami-ashigara (JP); Norihito Kasada, Minami-ashigara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/625,428

(22) Filed: Jun. 16, 2017

(65) Prior Publication Data

US 2017/0372741 A1    Dec. 28, 2017

(30) Foreign Application Priority Data

Jun. 24, 2016 (JP) .................. 2016-125192

(51) Int. Cl.
*G11B 5/735* (2006.01)
*G11B 5/725* (2006.01)
(Continued)

(52) U.S. Cl.
CPC .............. *G11B 5/735* (2013.01); *G11B 5/712* (2013.01); *G11B 5/725* (2013.01); *G11B 5/78* (2013.01)

(58) Field of Classification Search
None
See application file for complete search history.

(56) References Cited

U.S. PATENT DOCUMENTS 3,966,686 A    6/1976 Asakura et al.
4,112,187 A    9/1978 Asakura et al.
(Continued)

FOREIGN PATENT DOCUMENTS

DE    101 46 429 A1    3/2002
GB    2495356 A    4/2013
(Continued)

OTHER PUBLICATIONS

An Office Action dated May 4, 2018, which issued during the prosecution of U.S. Appl. No. 15/422,821.
(Continued)

*Primary Examiner* — Kevin M Bernatz
(74) *Attorney, Agent, or Firm* — Sughrue Mion, PLLC

(57) ABSTRACT

A magnetic tape in which a thickness of a back coating layer is equal to or smaller than 0.20 μm. A C—H derived C concentration calculated from a C—H peak area ratio of C1s spectra obtained by X-ray photoelectron spectroscopic analysis performed on the surface of the back coating layer at a photoelectron take-off angle of 10 degrees is equal to or greater than 35 atom %. The full widths at half maximum of spacing distribution measured by optical interferometry regarding the surface of the back coating layer before and after performing a vacuum heating with respect to the magnetic tape are respectively greater than 0 nm and equal to or smaller than 10.0 nm. The difference between the spacing measured after performing the vacuum heating and a spacing measured before performing the vacuum heating is greater than 0 nm and equal to or smaller than 8.0 nm.

18 Claims, 2 Drawing Sheets

(51) Int. Cl.
*G11B 5/712* (2006.01)
*G11B 5/78* (2006.01)

(56) References Cited

U.S. PATENT DOCUMENTS

| | | | |
|---|---|---|---|
| 4,425,404 A | 1/1984 | Suzuki et al. | |
| 4,693,930 A | 9/1987 | Kuo et al. | |
| 4,746,569 A | 5/1988 | Takahashi et al. | |
| 4,825,317 A | 4/1989 | Rausch | |
| 5,242,752 A | 9/1993 | Isobe et al. | |
| 5,419,938 A | 5/1995 | Kagotani et al. | |
| 5,445,881 A | 8/1995 | Irie | |
| 5,474,814 A | 12/1995 | Komatsu et al. | |
| 5,496,607 A | 3/1996 | Inaba et al. | |
| 5,540,957 A | 7/1996 | Ueda et al. | |
| 5,585,032 A | 12/1996 | Nakata et al. | |
| 5,645,917 A | 7/1997 | Ejiri et al. | |
| 5,689,384 A | 11/1997 | Albrecht et al. | |
| 5,728,454 A | 3/1998 | Inaba et al. | |
| 5,786,074 A | 7/1998 | Soui | |
| 5,827,600 A | 10/1998 | Ejiri et al. | |
| 6,099,957 A | 8/2000 | Yamamoto et al. | |
| 6,183,606 B1 | 2/2001 | Kuo et al. | |
| 6,207,252 B1 * | 3/2001 | Shimomura | G11B 5/70 428/141 |
| 6,228,461 B1 | 5/2001 | Sueki et al. | |
| 6,254,964 B1 | 7/2001 | Saito et al. | |
| 6,261,647 B1 | 7/2001 | Komatsu et al. | |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 | 11/2003 | Buczek et al. | |
| 6,686,022 B2 | 2/2004 | Takano et al. | |
| 6,770,359 B2 | 8/2004 | Masaki | |
| 6,791,803 B2 | 9/2004 | Saito et al. | |
| 6,835,461 B1 | 12/2004 | Yamagata et al. | |
| 6,893,746 B1 | 5/2005 | Kirino et al. | |
| 6,921,592 B2 | 7/2005 | Tani et al. | |
| 6,939,606 B2 | 9/2005 | Hashimoto et al. | |
| 6,950,269 B1 | 9/2005 | Johnson | |
| 7,014,927 B2 | 3/2006 | Sueki et al. | |
| 7,029,726 B1 | 4/2006 | Chen et al. | |
| 7,153,366 B1 | 12/2006 | Chen et al. | |
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,803,471 B1 | 9/2010 | Ota et al. | |
| 7,839,599 B2 | 11/2010 | Bui et al. | |
| 8,000,057 B2 | 8/2011 | Bui et al. | |
| 8,279,739 B2 | 10/2012 | Kanbe et al. | |
| 8,524,108 B2 | 9/2013 | Hattori | |
| 8,535,817 B2 * | 9/2013 | Imaoka | G11B 5/70 428/844 |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,311,946 B2 | 4/2016 | Tanaka et al. | |
| 9,495,985 B2 | 11/2016 | Xia et al. | |
| 9,530,444 B2 | 12/2016 | Kasada | |
| 9,542,967 B2 | 1/2017 | Sekiguchi et al. | |
| 9,564,161 B1 | 2/2017 | Cherubini et al. | |
| 9,601,146 B2 | 3/2017 | Kasada et al. | |
| 9,704,425 B2 | 7/2017 | Zhang et al. | |
| 9,704,525 B2 | 7/2017 | Kasada | |
| 9,704,527 B2 * | 7/2017 | Kasada | G11B 5/70605 |
| 9,711,174 B2 | 7/2017 | Kasada et al. | |
| 9,721,605 B2 | 8/2017 | Oyanagi et al. | |
| 9,721,606 B2 * | 8/2017 | Kasada | G11B 5/8404 |
| 9,721,607 B2 | 8/2017 | Tada et al. | |
| 9,748,026 B2 | 8/2017 | Shirata | |
| 9,773,519 B2 | 9/2017 | Kasada et al. | |
| 9,779,772 B1 | 10/2017 | Kasada et al. | |
| 9,837,116 B2 * | 12/2017 | Ozawa | G11B 5/00813 |
| 9,959,894 B2 | 5/2018 | Omura | |
| 9,972,351 B1 | 5/2018 | Kaneko et al. | |
| 9,978,414 B1 | 5/2018 | Kaneko et al. | |
| 9,984,710 B2 | 5/2018 | Kasada | |
| 9,984,712 B1 | 5/2018 | Ozawa | |
| 9,984,716 B1 | 5/2018 | Kaneko et al. | |
| 10,008,230 B1 | 6/2018 | Ozawa et al. | |
| 10,026,430 B2 | 7/2018 | Kasada et al. | |
| 10,026,433 B2 | 7/2018 | Kasada et al. | |
| 10,026,434 B2 | 7/2018 | Oyanagi et al. | |
| 10,026,435 B2 | 7/2018 | Kasada et al. | |
| 10,062,403 B1 | 8/2018 | Kasada et al. | |
| 10,074,393 B2 | 9/2018 | Kaneko et al. | |
| 10,134,433 B2 * | 11/2018 | Kasada | G11B 5/70626 |
| 10,170,144 B2 | 1/2019 | Ozawa et al. | |
| 2001/0038928 A1 | 11/2001 | Nakamigawa et al. | |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1 | 5/2003 | Ejiri et al. | |
| 2003/0124386 A1 | 7/2003 | Masaki | |
| 2003/0170498 A1 | 9/2003 | Inoue | |
| 2003/0228493 A1 | 12/2003 | Doushita et al. | |
| 2004/0018388 A1 | 1/2004 | Kitamura et al. | |
| 2004/0053074 A1 | 3/2004 | Jingu et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2004/0265643 A1 | 12/2004 | Ejiri | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1 | 2/2006 | Kuse et al. | |
| 2006/0056095 A1 | 3/2006 | Saitou | |
| 2006/0068232 A1 | 3/2006 | Mikamo et al. | |
| 2006/0232883 A1 | 10/2006 | Biskeborn et al. | |
| 2007/0009769 A1 | 1/2007 | Kanazawa | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 | 12/2008 | Lee et al. | |
| 2009/0027812 A1 | 1/2009 | Noguchi et al. | |
| 2009/0087689 A1 | 4/2009 | Doushita et al. | |
| 2009/0161249 A1 | 6/2009 | Takayama et al. | |
| 2009/0162701 A1 | 6/2009 | Jensen et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1 | 3/2010 | Biskeborn et al. | |
| 2010/0081011 A1 | 4/2010 | Nakamura | |
| 2010/0134929 A1 | 6/2010 | Ito | |
| 2010/0227201 A1 | 9/2010 | Sasaki et al. | |
| 2010/0246073 A1 | 9/2010 | Katayama | |
| 2011/0003241 A1 | 1/2011 | Kaneko et al. | |
| 2011/0051280 A1 | 3/2011 | Karp et al. | |
| 2011/0052908 A1 | 3/2011 | Imaoka | |
| 2011/0077902 A1 | 3/2011 | Awezec et al. | |
| 2011/0151281 A1 | 6/2011 | Inoue | |
| 2011/0244272 A1 | 10/2011 | Suzuki et al. | |
| 2012/0045664 A1 * | 2/2012 | Tanaka | G11B 5/71 428/840.2 |
| 2012/0177951 A1 | 7/2012 | Yamazaki et al. | |
| 2012/0183811 A1 | 7/2012 | Hattori et al. | |
| 2012/0196156 A1 | 8/2012 | Suzuki | |
| 2012/0243120 A1 | 9/2012 | Harasawa et al. | |
| 2012/0244387 A1 | 9/2012 | Mod et al. | |
| 2012/0251845 A1 | 10/2012 | Wang et al. | |
| 2013/0029183 A1 | 1/2013 | Omura et al. | |
| 2013/0084470 A1 | 4/2013 | Hattori et al. | |
| 2013/0088794 A1 | 4/2013 | Cherubini et al. | |

(56) References Cited

U.S. PATENT DOCUMENTS

| | | |
|---|---|---|
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1* | 3/2017 | Ozawa .................. G11B 5/70 |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1* | 8/2017 | Oyanagi ................. G11B 5/70 |
| 2017/0221517 A1* | 8/2017 | Ozawa .................. G11B 5/66 |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0337944 A1 | 11/2017 | Biskeborn et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1* | 12/2017 | Oyanagi ............ G11B 5/00813 |
| 2017/0372738 A1 | 12/2017 | Kasada |
| 2017/0372739 A1* | 12/2017 | Ozawa .................. G11B 5/78 |
| 2017/0372740 A1* | 12/2017 | Ozawa .................. G11B 5/78 |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1* | 12/2017 | Ozawa .................. G11B 5/584 |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182429 A1 | 6/2018 | Kasada et al. |
| 2018/0182430 A1 | 6/2018 | Ozawa et al. |
| 2018/0182428 A1 | 7/2018 | Kasada et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1* | 8/2018 | Kasada .................. G11B 5/735 |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1* | 10/2018 | Kasada .................. G11B 5/714 |
| 2018/0286451 A1 | 10/2018 | Ozawa et al. |
| 2018/0286452 A1 | 10/2018 | Ozawa et al. |
| 2018/0286453 A1* | 10/2018 | Kasada .................. G11B 5/714 |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1* | 1/2019 | Tada .................... G11B 5/66 |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1* | 1/2019 | Ozawa .................. G11B 5/70 |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |

FOREIGN PATENT DOCUMENTS

| | | |
|---|---|---|
| JP | 61-11924 A | 1/1986 |
| JP | 61-139923 A | 6/1986 |
| JP | 61-139932 A | 6/1986 |
| JP | 63-129519 A | 6/1988 |
| JP | 63249932 A | 10/1988 |
| JP | 64-57422 A | 3/1989 |
| JP | 6460819 A | 3/1989 |
| JP | 5-258283 A | 10/1993 |
| JP | 5-298653 A | 11/1993 |
| JP | 7-57242 A | 3/1995 |
| JP | 11-110743 A | 4/1999 |
| JP | 11-175949 A | 7/1999 |
| JP | 11-273051 A | 10/1999 |
| JP | 2000-251240 A | 9/2000 |
| JP | 2002-157726 A | 5/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004005820 A | 1/2004 |
| JP | 2004-133997 A | 4/2004 |
| JP | 2004-185676 A | 7/2004 |
| JP | 2005-38579 A | 2/2005 |

(56) References Cited

FOREIGN PATENT DOCUMENTS

| | | |
|---|---|---|
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-273039 A | 10/2007 |
| JP | 2007-287310 A | 11/2007 |
| JP | 2007-297427 A | 11/2007 |
| JP | 2008-243317 A | 10/2008 |
| JP | 2009-283082 A | 12/2009 |
| JP | 2010-049731 A | 3/2010 |
| JP | 201148878 A | 3/2011 |
| JP | 2011-210288 A | 10/2011 |
| JP | 2011-225417 A | 11/2011 |
| JP | 2012-038367 A | 2/2012 |
| JP | 2012043495 A | 3/2012 |
| JP | 2012-203955 A | 10/2012 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-051493 A | 4/2016 |

OTHER PUBLICATIONS

An Office Action dated May 4, 2018, which issued during the prosecution of U.S. Appl. No. 15/422,944.
An Office Action dated May 7, 2018, which issued during the prosecution of U.S. Appl. No. 15/624,897.
An Office Action dated May 7, 2018, which issued during the prosecution of U.S. Appl. No. 15/624,792.
An Office Action dated May 7, 2018, which issued during the prosecution of U.S. Appl. No. 15/626,832.
An Office Action dated May 2, 2018, which issued during the prosecution of U.S. Appl. No. 15/280,195.
Notice of Allowance dated Aug. 30, 2017, which issued during the prosecution of U.S. Appl. No. 15/466,143.
Notice of Allowance dated Apr. 27, 2017, which issued during the prosecution of U.S. Appl. No. 15/052,115.
Notice of Allowance dated Jun. 2, 2017, which issued during the prosecution of U.S. Appl. No. 15/218,190.
An Office Action dated Oct. 3, 2018, which issued during the prosecution of U.S. Appl. No. 15/280,195.
An Office Action dated Jul. 6, 2018, which issued during the prosecution of U.S. Appl. No. 15/848,173.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,897.
Notice of Allowance dated Oct. 11, 2018, which issued during the prosecution of U.S. Appl. No. 15/624,792.
Notice of Allowance dated Oct. 12, 2018, which issued during the prosecution of U.S. Appl. No. 15/626,832.
Notice of Allowance dated Oct. 11, 2018, which issued during the prosecution of U.S. Appl. No. 15/380,336.
An Office Action dated Oct. 15, 2018, which issued during the prosecution of U.S. Appl. No. 15/619,012.
An Office Action dated Oct. 9, 2018, which issued during the prosecution of U.S. Appl. No. 15/628,814.
An Office Action dated Oct. 22, 2018, which issued during the prosecution of U.S. Appl. No. 15/854,439.
An Office Action dated Sep. 24, 2018, which issued during the prosecution of U.S. Appl. No. 15/690,400.
An Office Action dated Sep. 27, 2018, which issued during the prosecution of U.S. Appl. No. 15/690,906.
An Office Action dated Oct. 12, 2018, which issued during the prosecution of U.S. Appl. No. 15/626,355.
An Office Action dated Oct. 12, 2018, which issued during the prosecution of U.S. Appl. No. 15/627,696.
An Office Action dated Sep. 27, 2018, which issued during the prosecution of U.S. Appl. No. 15/854,383.
An Office Action dated Aug. 10, 2017, which issued during the prosecution of U.S. Appl. No. 14/870,618.
Notice of Allowance dated Feb. 14, 2018, which issued during the prosecution of U.S. Appl. No. 14/870,618.
Office Action dated Sep. 26, 2017 issued by the Japanese Patent Office in JP Appln. No. 2014-265723 corresponding to U.S. Appl. No. 14/870,618.
Office Action dated Sep. 26, 2017 issued by the Japanese Patent Office in JP Appln. No. 2015-249264 corresponding to U.S. Appl. No. 14/870,618.
Communication dated Dec. 6, 2016 from the U.S. Patent and Trademark Office in U.S. Appl. No. 14/757,555.
Communication dated Dec. 5, 2016 from the U.S. Patent and Trademark Office in U.S. Appl. No. 14/978,834.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Aug. 28, 2018, which issued during the prosecution of U.S. Appl. No. 15/422,821.
Communication dated Aug. 3, 2018 from the U.S. Patent and Trademark Office in U.S. Appl. No. 15/380,336.
Communication dated Aug. 23, 2018 from the U.S. Patent and Trademark Office in U.S. Appl. No. 15/614,876.
Communication dated Aug. 24, 2018 from the U.S. Patent and Trademark Office in U.S. Appl. No. 15/620,916.
Communication dated Aug. 23, 2018 from the U.S. Patent and Trademark Office in U.S. Appl. No. 15/621,464.
Communication dated Aug. 23, 2018 from the U.S. Patent and Trademark Office in U.S. Appl. No. 15/626,720.
Notice of Allowance dated Dec. 2, 2016 which issued during the prosecution of U.S. Appl. No. 14/753,227.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
Office Action dated Feb. 4, 2016 which issued during the prosecution of U.S. Appl. No. 14/753,227.
Notice of Allowance dated Jul. 12, 2017 which issued during the prosecution of U.S. Appl. No. 15/388,864.
Office Action dated Jun. 9, 2017 which issued during the prosecution of U.S. Appl. No. 15/388,864.
Office Action dated Apr. 26, 2017 which issued during the prosecution of U.S. Appl. No. 15/388,864.
Office Action dated Jun. 7, 2018 which issued during the prosecution of U.S. Appl. No. 15/380,309.
Office Action dated Aug. 3, 2018 which issued during the prosecution of U.S. Appl. No. 15/388,911.
Office Action dated May 30, 2018 which issued during the prosecution of U.S. Appl. No. 15/388,911.
Office Action dated Nov. 16, 2016 which issued during the prosecution of U.S. Appl. No. 15/072,550.
Notice of Allowance dated Apr. 25, 2017 which issued during the prosecution of U.S. Appl. No. 15/072,550.
Notice of Allowance dated May 10, 2018 which issued during the prosecution of U.S. Appl. No. 15/615,871.
Notice of Allowance dated Mar. 16, 2018 which issued during the prosecution of U.S. Appl. No. 15/854,410.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Office Action dated Dec. 14, 2018, which issued during the prosecution of U.S. Appl. No. 15/920,517.

(56) References Cited

OTHER PUBLICATIONS

Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Jul. 3, 2018, which issued during the prosecution of U.S. Appl. No. 15/920,518.
Office Action dated Nov. 28, 2018, which issued during the prosecution of U.S. Appl. No. 15/899,587.
Notice of Allowance dated Apr. 5, 2018, which issued during the prosecution of U.S. Appl. No. 14/867,752.
Notice of Allowance dated Aug. 9, 2018, which issued during the prosecution of U.S. Appl. No. 15/920,563.
Notice of Allowance dated Jul. 13, 2018, which issued during the prosecution of U.S. Appl. No. 15/920,782.
Notice of Allowance dated Jun. 28, 2017, which issued during the prosecution of U.S. Appl. No. 15/464,991.
Notice of Allowance dated Mar. 14, 2018, which issued during the prosecution of U.S. Appl. No. 15/854,474.
Notice of Allowance dated Mar. 19, 2018, which issued during the prosecution of U.S. Appl. No. 15/378,907.
Notice of Allowance dated Mar. 21, 2018, which issued during the prosecution of U.S. Appl. No. 15/241,286.
Notice of Allowance dated Mar. 21, 2018, which issued during the prosecution of U.S. Appl. No. 15/241,297.
Notice of Allowance dated Mar. 27, 2018, which issued during the prosecution of U.S. Appl. No. 15/241,631.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Office Action dated Apr. 19, 2018, which issued during the prosecution of U.S. Appl. No. 15/854,438.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543.
Office Action dated Jan. 31, 2018, which issued during the prosecution of U.S. Appl. No. 14/867,752.
Office Action dated Jul. 6, 2015, which issued during the prosecution of U.S. Appl. No. 14/209,065.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 8, 2016 from the Japanese Patent Office in Japanese Application No. 2014-199022.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 5, 2017, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Dec. 25, 2018 in Japanese Application No. 2015-254192.
Office Action dated Dec. 25, 2018 in Japanese Application No. 2015-245144.
Office Action dated Dec. 25, 2018 in Japanese Application No. 2015-245145.
Office Action dated Dec. 31, 2018 in U.S. Appl. No. 16/009,603.
Notice of Allowance dated Jan. 10, 2019 in U.S. Appl. No. 15/848,173.
Office Action dated Jan. 10, 2019 in U.S. Appl. No. 15/899,430.
Notice of Allowance dated Jan. 17, 2019 in U.S. Appl. No. 15/422,944.
Notice of Allowance dated Jan. 17, 2019 in U.S. Appl. No. 15/626,720.
Office Action dated Nov. 14, 2018 in U.S. Appl. No. 16/100,289.
"Introduction to TMR Magnetic Sensors", Anonymous, Mar. 12, 2015, MR Sensor Technology, pp. 1-5 (Year: 2015).
Notice of Allowance dated Aug. 27, 2018 in U.S. Appl. No. 15/920,635.
Notice of Allowance dated Mar. 13, 2019 in U.S. Appl. No. 16/100,289.
Notice of Allowance dated Mar. 5, 2019 in U.S. Appl. No. 16/009,603.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 27, 2018 in U.S. Appl. No. 15/900,334.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Office Action dated Mar. 5, 2019 in U.S. Appl. No. 15/443,026.
Office Action dated Mar. 6, 2019 in U.S. Appl. No. 15/854,403.
Office Action dated Mar. 7, 2019 in U.S. Appl. No. 15/854,439.
Office Action dated Nov. 19, 2018 in U.S. Appl. No. 15/900,141.
Notice of Allowance dated Mar. 18, 2019 in U.S. Appl. No. 15/626,355.
Notice of Allowance dated Mar. 18, 2019 in U.S. Appl. No. 15/628,814.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.

(56) References Cited

OTHER PUBLICATIONS

Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
U.S. Appl. No. 15/422,821, Pending.
U.S. Appl. No. 15/422,944, Allowed.
U.S. Appl. No. 15/624,897, Allowed; RCE filed Nov. 21, 2018.
U.S. Appl. No. 15/624,792, Allowed; RCE filed Nov. 21, 2018.
U.S. Appl. No. 15/626,832, Allowed; RCE filed Nov. 21, 2018.
U.S. Appl. No. 15/625,428 (the present Application), Allowed Dec. 4, 2018; RCE Filed.
U.S. Appl. No. 15/380,336, Allowed; RCE filed Nov. 21, 2018.
U.S. Appl. No. 15/614,876, Pending.
U.S. Appl. No. 15/620,916, Pending.
U.S. Appl. No. 15/621,464, Pending.
U.S. Appl. No. 15/626,720, Allowed.
U.S. Appl. No. 15/854,383, Pending.
U.S. Appl. No. 15/854,439, Pending.
U.S. Appl. No. 15/848,173, Allowed.
U.S. Appl. No. 15/628,814, Pending.
U.S. Appl. No. 15/626,355, Pending.
U.S. Appl. No. 15/380,309, Pending.
U.S. Appl. No. 15/241,286, Patented as U.S. Pat. No. 10,026,433.
U.S. Appl. No. 15/920,563, Allowed.
U.S. Appl. No. 15/900,080, Pending.
U.S. Appl. No. 15/900,230, Pending.
U.S. Appl. No. 15/900,164, Pending.
U.S. Appl. No. 15/920,518, Allowed.
U.S. Appl. No. 15/899,430, Pending.
U.S. Appl. No. 15/920,515, Pending.
U.S. Appl. No. 15/920,517, Pending.
U.S. Appl. No. 15/920,538, Pending.
U.S. Appl. No. 15/920,544, Pending.
U.S. Appl. No. 15/920,768, Allowed; RCE filed.
U.S. Appl. No. 16/009,603, Quayle Action issued (RCE filed).
U.S. Appl. No. 16/182,083, Pending (Not yet published; continuation of U.S. Appl. No. 15/920,768).
U.S. Appl. No. 16/100,289, Pending.
U.S. Appl. No. 15/900,106, Pending.
Notice of Allowance dated Jan. 30, 2019 in U.S. Appl. No. 15/854,409.
Office Action dated Dec. 20, 2018 in U.S. Appl. No. 15/900,106.
Office Action dated Jan. 29, 2019 in U.S. Appl. No. 15/614,876.
Office Action dated Jan. 30, 2019 in U.S. Appl. No. 15/620,916.
Notice of Allowance dated Apr. 30, 2019 in U.S. Appl. No. 15/380,309.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated May 23, 2019 in U.S. Appl. No. 15/388,911.
Notice of Allowance dated Jun. 6, 2019 in U.S. Appl. No. 15/854,383.
Office Action dated Jun. 10, 2019 in U.S. Appl. No. 15/920,518.
Office Action dated Jun. 6, 2019 in U.S. Appl. No. 15/899,587.
Notice of Allowance dated Jun. 25, 2019 in U.S. Appl. No. 15/620,916.
Office Action dated Jun. 25, 2019 in Japanese Application No. 2015-245144.
Notice of Allowance dated Jun. 27, 2019 in U.S. Appl. No. 15/854,439.
U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/280,195, Pending.
U.S. Appl. No. 15/422,821, Allowed.
U.S. Appl. No. 15/422,944, Allowed; QPIDS filed.
U.S. Appl. No. 15/466,143, Patented as U.S. Pat. No. 9,837,116.
U.S. Appl. No. 15/619,012, Pending.
U.S. Appl. No. 15/624,897, Pending.
U.S. Appl. No. 15/624,792, Pending.
U.S. Appl. No. 15/626,832, Pending.
U.S. Appl. No. 15/625,428 (the present Application), Allowed.
U.S. Appl. No. 14/978,834, Patented as U.S. Pat. No. 9,721,605.
U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/380,336, Pending.
U.S. Appl. No. 15/614,876, Allowed.
U.S. Appl. No. 15/620,916, Allowed.
U.S. Appl. No. 15/621,464, Allowed.
U.S. Appl. No. 15/626,720, Allowed; Qpids filed.
U.S. Appl. No. 15/854,383, Allowed.
U.S. Appl. No. 15/854,507, Patented as U.S. Pat. No. 9,984,716.
U.S. Appl. No. 15/854,439, Allowed.
U.S. Appl. No. 15/854,506, Patented as U.S. Pat. No. 10,008,230.
U.S. Appl. No. 15/848,173, Allowed; QPIDS filed.
U.S. Appl. No. 15/628,814, Allowed; RCE filed.
U.S. Appl. No. 15/690,400, Pending.
U.S. Appl. No. 15/690,906, Pending.
U.S. Appl. No. 15/626,355, Allowed; RCE filed.
U.S. Appl. No. 15/627,696, Pending.
U.S. Appl. No. 14/870,618, Patented as U.S. Pat. No. 9,959,894.
U.S. Appl. No. 15/388,911, Pending.
U.S. Appl. No. 14/753,227, Patented as U.S. Pat. No. 9,601,146.
U.S. Appl. No. 15/380,309, Allowed.
U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. No. 10,074,393.
U.S. Appl. No. 15/854,410, Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.
U.S. Appl. No. 15/241,286, Patented as U.S. Pat. No. 10,026,4331.
U.S. Appl. No. 15/464,991, Patented as U.S. Pat. No. 9,779,772.
U.S. Appl. No. 14/867,752, Patented as U.S. Pat. No. 10,026,430.
U.S. Appl. No. 15/854,438, Allowed.
U.S. Appl. No. 15/854,409, Allowed.
U.S. Appl. No. 15/443,026, Pending.

(56) References Cited

OTHER PUBLICATIONS

U.S. Appl. No. 15/920,782, Patented as U.S. Pat. No. 10,134,433.
U.S. Appl. No. 15/920,563, Allowed; QPIDS filed.
U.S. Appl. No. 15/920,533, Pending.
U.S. Appl. No. 15/900,144, Pending.
U.S. Appl. No. 15/900,080, Allowed.
U.S. Appl. No. 15/900,230, Allowed.
U.S. Appl. No. 15/900,164, Allowed.
U.S. Appl. No. 15/920,518, Pending.
U.S. Appl. No. 15/899,587, Pending.
U.S. Appl. No. 15/899,430, Allowed.
U.S. Appl. No. 15/920,515, Allowed.
U.S. Appl. No. 15/920,517, Allowed.
U.S. Appl. No. 15/920,538, Allowed.
U.S. Appl. No. 15/920,544, Allowed.
U.S. Appl. No. 15/920,768, Allowed.
U.S. Appl. No. 16/009,603, Allowed.
U.S. Appl. No. 16/182,083, Pending (Continuation of U.S. Appl. No. 15/920,768).
U.S. Appl. No. 15/705,531, Pending.
U.S. Appl. No. 16/232,165, Pending (Continuation of U.S. Appl. No. 15/854,438).
U.S. Appl. No. 16/100,289, Allowed; RCE filed.
U.S. Appl. No. 16/038,669, Pending.
U.S. Appl. No. 15/900,106, Allowed.
U.S. Appl. No. 15/900,412, Patented as U.S. Pat. No. 10,062,403.
U.S. Appl. No. 15/900,141, Allowed.
U.S. Appl. No. 15/900,160, Allowed.
U.S. Appl. No. 15/900,345, Allowed.
U.S. Appl. No. 15/900,379, Allowed.
U.S. Appl. No. 16/012,018, Pending.
U.S. Appl. No. 15/920,616, Allowed.
U.S. Appl. No. 15/900,242, Allowed.
U.S. Appl. No. 15/900,334, Allowed.
U.S. Appl. No. 15/920,592, Allowed.
U.S. Appl. No. 15/920,635, Patented as U.S. Pat. No. 10,170,144.
U.S. Appl. No. 16/160,377, Pending.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Allowed.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, Allowed.
U.S. Appl. No. 16/142,560, Pending.
U.S. Appl. No. 16/184,312, Pending.
U.S. Appl. No. 16/143,646, Allowed.
U.S. Appl. No. 16/144,428, Pending.
U.S. Appl. No. 16/143,747, Pending.
U.S. Appl. No. 16/440,161, Pending.

\* cited by examiner

MAGNETIC TAPE HAVING CHARACTERIZED BACK COATING LAYER

CROSS-REFERENCE TO RELATED APPLICATIONS

This application claims priority under 35 U.S.C. 119 to Japanese Patent Application No. 2016-125192 filed on Jun. 24, 2016. The above application is hereby expressly incorporated by reference, in its entirety.

BACKGROUND OF THE INVENTION

1. Field of the Invention

The present invention relates to a magnetic tape.

2. Description of the Related Art

Magnetic recording media are divided into tape-shaped magnetic recording media and disk-shaped magnetic recording media, and tape-shaped magnetic recording media, that is, magnetic tapes are mainly used for data storage such as data back-up.

As the magnetic tapes, JP2009-283082A discloses a magnetic tape including a back coating layer on a surface side of a non-magnetic support opposite to a surface side on which a magnetic layer is provided. JP2009-283082A further discloses that the magnetic tape includes a lubricant in the back coating layer.

SUMMARY OF THE INVENTION

The magnetic tape is normally accommodated in a magnetic tape cartridge in a state of being wound around a reel. The recording and reproducing of signals to the magnetic tape are normally performed by mounting the magnetic tape cartridge on a drive and allowing the magnetic tape to run in the drive. Generally, at the time of such running, the surface of the back coating layer comes into contact with a drive constituent element such as a roller which sends and/or winds up the magnetic tape in the drive. Here, it is surmised that, when the surface of the back coating layer and the drive constituent element have suitable compatibility with each other, the running of the magnetic tape in the drive can be stabilized (running stability can be improved). In regards to this point, the inventors have thought that a lubricant included in the back coating layer controls the compatibility between the surface of the back coating layer and the drive constituent element and contributes to the improvement in running stability. Meanwhile, in recent years, magnetic tapes are used in various hygrothermal environments along with an increasing demand for magnetic tapes. Although the reason is not clear, in an environment of a low temperature (for example, 10° C. to 15° C.) and high humidity (for example, relative humidity of 75% to 85%) among the various hygrothermal environments in which the magnetic tapes are used, the running stability normally tends to easily decrease.

Meanwhile, in order to increase the recording capacity for 1 reel of the magnetic tape cartridge, it is necessary to increase the total length of the magnetic tape accommodated in 1 reel of the magnetic tape cartridge. In order to increase the recording capacity, it is necessary that the magnetic tape is thinned (hereinafter, referred to as "thinning"). As one method of thinning the magnetic tape, a method of decreasing a thickness of the back coating layer is used. Regarding the thickness of the back coating layer, a back coating layer having a thickness of 0.5 µm is formed in Examples of JP2009-283082A. However, in order to realize even higher recording capacity which is demanded in recent years, it is desired that the back coating layer is even more thinned (hereinafter, referred to as "thinning").

Therefore, in the studies regarding the thinning of the back coating layer more than the back coating layer formed in Examples of JP2009-283082A, the inventors have determined that it is difficult to prevent deterioration of the running stability of a magnetic tape including a thinned back coating layer in a low temperature and high humidity environment, by simply allowing the back coating layer to include a lubricant.

An object of the invention is to provide a magnetic tape including a thinned back coating layer and capable of exhibiting excellent running stability in a low temperature and high humidity environment.

According to one aspect of the invention, there is provided a magnetic tape comprising: a non-magnetic support; a magnetic layer including ferromagnetic powder and a binder on one surface side of the non-magnetic support; and a back coating layer including non-magnetic powder and a binder on the other surface side, in which a thickness of the back coating layer is equal to or smaller than 0.20 µm, the back coating layer includes one or more components selected from the group consisting of fatty acid and fatty acid amide and fatty acid ester, a C—H derived C concentration (hereinafter, also referred to as a "surface part derived C concentration") calculated from a C—H peak area ratio of C1s spectra obtained by X-ray photoelectron spectroscopic analysis performed on the surface of the back coating layer at a photoelectron take-off angle of 10 degrees, is equal to or greater than 35 atom %, a full width at half maximum of spacing distribution measured by optical interferometry regarding the surface of the back coating layer before performing a vacuum heating with respect to the magnetic tape (hereinafter, also referred to as "FWHM$_{before}$") is greater than 0 nm and equal to or smaller than 10.0 nm, a full width at half maximum of spacing distribution measured by optical interferometry regarding the surface of the back coating layer after performing the vacuum heating with respect to the magnetic tape (hereinafter, also referred to as "FWHM$_{after}$") is greater than 0 nm and equal to or smaller than 10.0 nm, and a difference (S$_{after}$−S$_{before}$) between a spacing S$_{after}$ measured by optical interferometry regarding the surface of the back coating layer after performing the vacuum heating with respect to the magnetic tape and a spacing S$_{before}$ measured by optical interferometry regarding the surface of the back coating layer before performing the vacuum heating with respect to the magnetic tape (hereinafter, also simply referred to as a "difference (S$_{after}$−S$_{before}$)") is greater than 0 nm and equal to or smaller than 8.0 nm.

In one aspect, the surface part C—H derived C concentration is 35 atom % to 60 atom %.

In one aspect, the surface part C—H derived C concentration is 40 atom % to 60 atom %.

In one aspect, the FWHM$_{before}$ is greater than 0 nm and equal to or smaller than 8.0 nm.

In one aspect, the FWHM$_{after}$ is greater than 0 nm and equal to or smaller than 8.0 nm.

In one aspect, the difference (S$_{after}$−S$_{before}$) is greater than 0 nm and equal to or smaller than 6.0 nm.

In one aspect, the thickness of the back coating layer is 0.05 µm to 0.20 µm.

In one aspect, the non-magnetic powder included in the back coating layer is one or more kinds of non-magnetic powder selected from the group consisting of inorganic powder and carbon black.

In one aspect, the content of the inorganic powder in the back coating layer is in a range of greater than 50.0 parts by mass to equal to or less than 100.0 parts by mass with respect to 100.0 parts by mass of the total content of the non-magnetic powder included in the back coating layer.

In one aspect, the magnetic tape further comprises a non-magnetic layer including non-magnetic powder and a binder between the non-magnetic support and the magnetic layer.

According to one aspect of the invention, it is possible to provide a magnetic tape including a back coating layer having a thickness equal to or smaller than 0.20 m and capable of exhibiting excellent running stability in a low temperature and high humidity environment.

DESCRIPTION OF THE PREFERRED EMBODIMENTS

Figure 1:
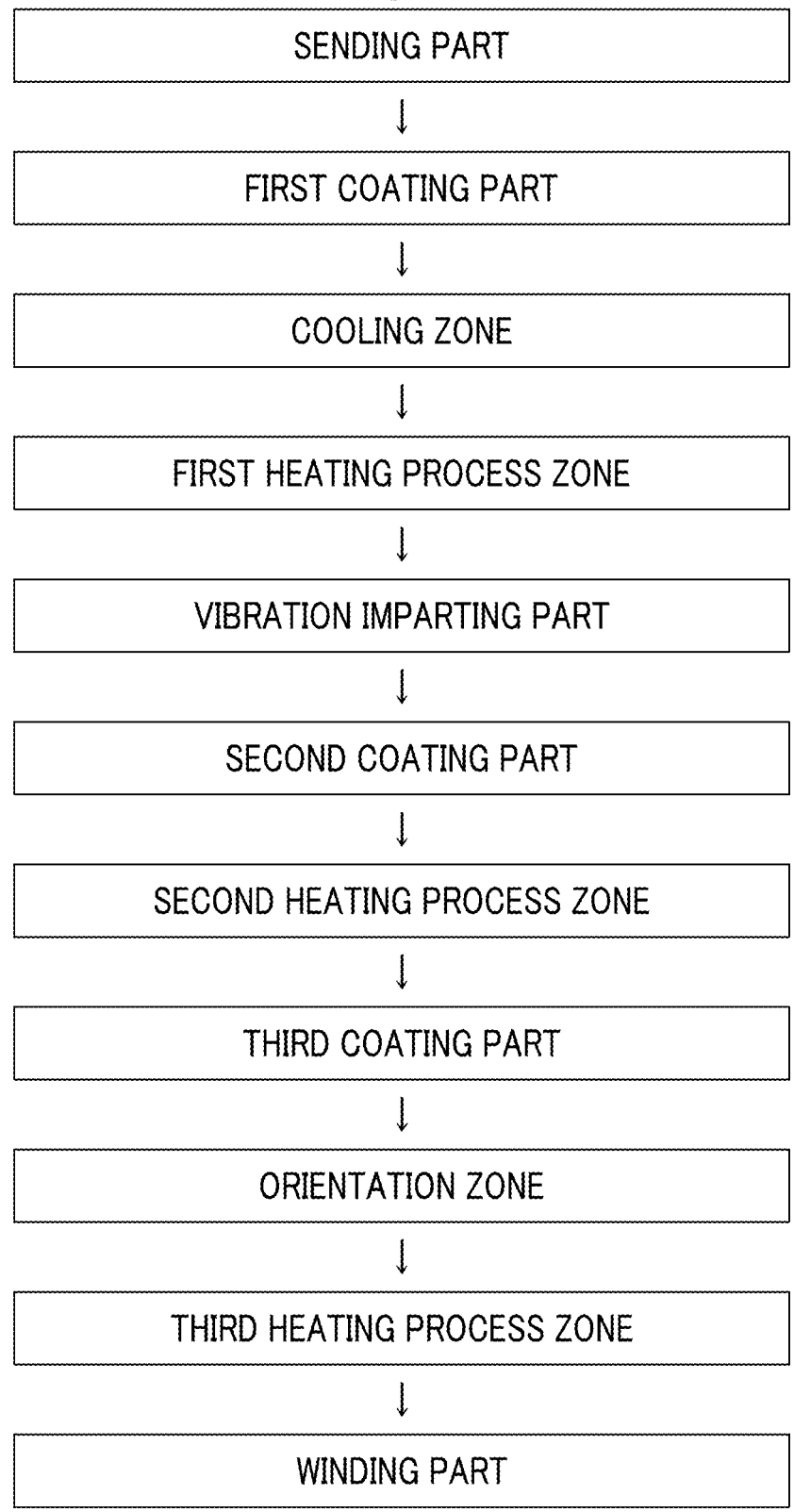
FIG. 1 shows an example (step schematic view) of a specific aspect of a magnetic tape manufacturing step.

According to one aspect of the invention, there is provided a magnetic tape including: a non-magnetic support; a magnetic layer including ferromagnetic powder and a binder on one surface side of the non-magnetic support; and a back coating layer including non-magnetic powder and a binder on the other surface side, in which a thickness of the back coating layer is equal to or smaller than 0.20 μm, the back coating layer includes one or more components selected from the group consisting of fatty acid and fatty acid amide and fatty acid ester, a C—H derived C concentration (surface part C—H derived C concentration) calculated from a C—H peak area ratio of C1s spectra obtained by X-ray photoelectron spectroscopic analysis performed on the surface of the back coating layer at a photoelectron take-off angle of 10 degrees, is equal to or greater than 35 atom %, a full width at half maximum of spacing distribution measured by optical interferometry regarding the surface of the back coating layer before performing a vacuum heating with respect to the magnetic tape ($FWHM_{before}$) is greater than 0 nm and equal to or smaller than 10.0 nm, a full width at half maximum of spacing distribution measured by optical interferometry regarding the surface of the back coating layer after performing the vacuum heating with respect to the magnetic tape ($FWHM_{after}$) is greater than 0 nm and equal to or smaller than 10.0 nm, and a difference ($S_{after}-S_{before}$) between a spacing $S_{after}$ measured by optical interferometry regarding the surface of the back coating layer after performing the vacuum heating with respect to the magnetic tape and a spacing $S_{before}$ measured by optical interferometry regarding the surface of the back coating layer before performing the vacuum heating with respect to the magnetic tape is greater than 0 nm and equal to or smaller than 8.0 nm.

Hereinafter, the magnetic tape will be described in detail. Hereinafter, "running stability" means running stability in a low temperature and high humidity environment, unless otherwise noted. The low temperature and high humidity environment is the environment of the temperature and the relative humidity exemplified above. In addition, the following descriptions include the surmise of the inventors. The invention is not limited to such a surmise. Hereinafter, the invention will be described with reference to the drawings. However, the invention is not limited to the exemplified aspect.

Thickness of Back Coating Layer

The thickness of the back coating layer of the magnetic tape is equal to or smaller than 0.20 μm. The thickness of the back coating layer can also be, for example, equal to or smaller than 0.18 μm or equal to or smaller than 0.15 μm, from a viewpoint of thinning the magnetic tape even more. In addition, the thickness of the back coating layer can be, for example, equal to or greater than 0.05 μm and can also be equal to or greater than 0.10 μm. The thinning of the back coating layer to have a thickness equal to or smaller than 0.20 μm contributes to the thinning of the magnetic tape including this back coating layer. However, as a result of the studies of the inventors, it was clear that the thinning of the back coating layer causes deterioration of the running stability in the low temperature and high humidity environment. In addition, as a result of the studies of the inventors, it was clear that, in the magnetic tape including the back coating layer having a thickness equal to or smaller than 0.20 μm, it is difficult to prevent the deterioration of the running stability in the low temperature and high humidity environment, by simply adding a lubricant to the back coating layer as in the related art. The inventors have surmised that the reason thereof is because of a tendency of deterioration of stiffness (rigidity) of the magnetic tape, a small amount of a lubricant which can be held in the layer, and the like in the magnetic tape including the back coating layer having a thickness equal to or smaller than 0.20 compared to a magnetic tape including a thicker back coating layer. However, this is merely a surmise.

With respect to this, in the magnetic tape including the back coating layer having a thickness equal to or smaller than 0.20 μm, when surface part C—H derived C concentration, the $FWHM_{before}$, the $FWHM_{after}$, and the difference ($S_{after}-S_{before}$) are respectively in the ranges described above, it is possible to prevent the deterioration of the running stability in the low temperature and high humidity environment. The inventors have thought that the surface part C—H derived C concentration is a value which can be an index of a state of a component selected from the group consisting of fatty acid and fatty acid amide present in the back coating layer, and the $FWHM_{before}$, the $FWHM_{after}$, and the difference ($S_{after}-S_{before}$) are values which can be an index of a state of fatty acid ester present in the back coating layer. The component selected from the group consisting of fatty acid and fatty acid amide, and fatty acid ester are components which can function as lubricants. The inventors have thought that the controlling of the states of these components present in the back coating layer by respectively setting the surface part C—H derived C concentration, the $FWHM_{before}$, the $FWHM_{after}$, and the difference ($S_{after}-S_{before}$) to be in the ranges described above, contributes to the improvement of the running stability. The above-mentioned point will be described later in detail.

Surface Part C—H Derived C Concentration

A C—H derived C concentration (surface part C—H derived C concentration) calculated from a C—H peak area ratio of C1s spectra obtained by X-ray photoelectron spectroscopic analysis performed on the surface of the back coating layer of the magnetic tape at a photoelectron take-off angle of 10 degrees, is equal to or greater than 35 atom %. The surface part C—H derived C concentration is preferably equal to or greater than 40 atom %, more preferably equal to or greater than 45 atom %, even more preferably equal to or greater than 50 atom %, and the higher surface part C—H derived C concentration is preferable, from a viewpoint of improving the running stability even more. In addition, the surface part C—H derived C concentration can be, for example, equal to or smaller than 60 atom %. However, since a high surface part C—H derived C concentration is preferable from a viewpoint of improving the running stability, the surface part C—H derived C concentration can exceed 60 atom %.

The surface part C—H derived C concentration is a value acquired by X-ray photoelectron spectroscopic analysis. The X-ray photoelectron spectroscopic analysis is an analysis method generally known as Electron Spectroscopy for Chemical Analysis (ESCA) or X-ray Photoelectron Spectroscopy (XPS). Hereinafter, the X-ray photoelectron spectroscopic analysis will be also referred to as ESCA. The ESCA is an analysis method using a phenomenon of photoelectron emission when a surface of a measurement target sample is irradiated with X-ray, and is widely used as an analysis method regarding a surface part of a measurement target sample. According to the ESCA, it is possible to perform a qualitative analysis and quantitative analysis by using X-ray photoemission spectra acquired by the analysis regarding the sample surface of the measurement target. A depth from the sample surface to the analysis position (hereinafter, also referred to as a "detection depth") and photoelectron take-off angle generally satisfy the following expression: detection depth≈mean free path of electrons×3×sin θ. In the expression, the detection depth is a depth where 95% of photoelectrons configuring X-ray photoemission spectra are generated, and θ is the photoelectron take-off angle. From the expression described above, it is found that, as the photoelectron take-off angle decreases, the analysis regarding a shallow part of the depth from the sample surface can be performed, and as the photoelectron take-off angle increases, the analysis regarding a deep part of the depth from the sample surface can be performed. In the analysis performed by the ESCA at a photoelectron take-off angle of 10 degrees, an extreme outermost surface part having a depth of approximately several nm from the sample surface generally becomes an analysis position. Accordingly, in the surface of the back coating layer of the magnetic tape, according to the analysis performed by the ESCA at a photoelectron take-off angle of 10 degrees, it is possible to perform a composition analysis regarding the extreme outermost surface part having a depth of approximately several nm from the surface of the back coating layer.

The C—H derived C concentration is a percentage of carbon atoms C configuring the C—H bond occupying total (based on atom) 100 atom % of all elements detected by the qualitative analysis performed by the ESCA. The magnetic tape includes one or more components selected from the group consisting of fatty acid and fatty acid amide in the back coating layer. Fatty acid and fatty acid amide are components which can function as lubricants in the magnetic tape. The inventors have considered that, on the surface of the back coating layer of the magnetic tape including one or more of these components in the back coating layer, the C—H derived C concentration obtained by the analysis performed by the ESCA at a photoelectron take-off angle of 10 degrees becomes an index of the presence amount of the components (one or more components selected from the group consisting of fatty acid and fatty acid amide) in the extreme outermost surface part of the back coating layer. Specific description is as follows.

In X-ray photoemission spectra (horizontal axis: bonding energy, vertical axis: strength) obtained by the analysis performed by the ESCA, the C1s spectra include information regarding an energy peak of a 1 s orbit of the carbon atoms C. In such C1s spectra, a peak positioned at the vicinity of the bonding energy 284.6 eV is a C—H peak. This C—H peak is a peak derived from the bonding energy of the C—H bond of the organic compound. The inventors have surmised that, in the extreme outermost surface part of the back coating layer including one or more components selected from the group consisting of fatty acid and fatty acid amide, main constituent components of the C—H peak are components selected from the group consisting of fatty acid and fatty acid amide. Accordingly, the inventors have considered that the C—H derived C concentration can be used as an index of the presence amount as described above. The inventors have thought that, in the magnetic tape in which one or more components selected from the group consisting of fatty acid and fatty acid amide are included in the back coating layer and the surface part C—H derived C concentration is equal to or greater than 35 atom %, a larger amount of one or more components selected from the group consisting of fatty acid and fatty acid amide is present in the extreme outermost surface part of the back coating layer, compared to the amount thereof in the magnetic tape of the related art. The inventors have surmised that the presence of a large amount of one or more components selected from the group consisting of fatty acid and fatty acid amide in the extreme outermost surface part of the back coating layer contributes to the smooth sliding between the surface of the back coating layer and the drive constituent element. When the surface of the back coating layer can smoothly slide on the drive constituent element, it is possible to improve the running stability.

However, the above-mentioned description is merely a surmise of the inventors and the invention is not limited thereto.

As described above, the surface part C—H derived C concentration is a value obtained by analysis using ESCA. A region for the analysis is a region having an area of 300 μm×700 μm at an arbitrary position of the surface of the back coating layer of the magnetic tape. The qualitative analysis is performed by wide scan measurement (pass energy: 160 eV, scan range: 0 to 1,200 eV, energy resolution: 1 eV/step) performed by ESCA. Then, spectra of entirety of elements detected by the qualitative analysis are obtained by narrow scan measurement (pass energy: 80 eV, energy resolution: 0.1 eV, scan range: set for each element so that the entirety of spectra to be measured is included). An atomic concentration (unit: atom %) of each element is calculated from the peak surface area of each spectrum obtained as described above. Here, an atomic concentration (C concentration) of carbon atoms is also calculated from the peak surface area of C1s spectra.

In addition, C1s spectra are obtained (pass energy: 10 eV, scan range: 276 to 296 eV, energy resolution: 0.1 eV/step). The obtained C1s spectra are subjected to a fitting process by a nonlinear least-squares method using a Gauss-Lorentz complex function (Gaussian component: 70%, Lorentz component: 30%), peak resolution of a peak of a C—H bond of the C1s spectra is performed, and a percentage (peak area ratio) of the separated C—H peak occupying the C1s spectra is calculated. A C—H derived C concentration is calculated by multiplying the calculated C—H peak area ratio by the C concentration.

An arithmetical mean of values obtained by performing the above-mentioned process at different positions of the surface of the back coating layer of the magnetic tape three times is set as the surface part C—H derived C concentration. In addition, the specific aspect of the process described above is shown Examples which will be described later.

As preferred means for adjusting the surface part C—H derived C concentration described above to be equal to or greater than 35 atom %, a cooling step can be performed in a back coating layer forming step which will be described later specifically. However, the magnetic tape is not limited to a magnetic tape manufactured through such a cooling step.

Spacing Distributions $FWHM_{before}$ and $FWHM_{after}$ and difference $(S_{after}-S_{before})$ Measurement Method The spacing distribution $FWHM_{after}$ and the spacing $S_{after}$ for acquiring the difference $(S_{after}-S_{before})$ are values acquired after performing the vacuum heating with respect to the magnetic tape. In the invention and the specification, the "vacuum heating" of the magnetic tape is performed by holding the magnetic tape in an environment of a pressure of 200 Pa to 0.01 MPa and at an atmosphere temperature of 70° C. to 90° C. for 24 hours.

In the invention and the specification, the spacing measured by optical interferometry regarding the surface of the back coating layer of the magnetic tape is a value measured by the following method. In the invention and the specification, the "surface of the back coating layer" of the magnetic tape is identical to the surface of the magnetic tape on the back coating layer side.

In a state where the magnetic tape and a transparent plate-shaped member (for example, glass plate or the like) are overlapped on each other so that the surface of the back coating layer of the magnetic tape faces the transparent plate-shaped member, a pressing member is pressed against the side of the magnetic tape opposite to the back coating layer side at pressure of $5.05 \times 10^4$ N/m (0.5 atm). In this state, the surface of the back coating layer of the magnetic tape is irradiated with light through the transparent plate-shaped member (irradiation region: 150,000 to 200,000 $\mu m^2$), and a spacing (distance) between the surface of the back coating layer of the magnetic tape and the surface of the transparent plate-shaped member is acquired based on intensity (for example, contrast of interference fringe image) of interference light generated due to a difference in an optical path between reflected light from the surface of the back coating layer of the magnetic tape and reflected light from the surface of the transparent plate-shaped member on the magnetic tape side. The light emitted here is not particularly limited. In a case where the emitted light is light having an emission wavelength over a comparatively wide wavelength range as white light including light having a plurality of wavelengths, a member having a function of selectively cutting light having a specific wavelength or a wavelength other than wavelengths in a specific wavelength range, such as an interference filter, is disposed between the transparent plate-shaped member and a light reception unit which receives reflected light, and light at some wavelengths or some wavelength ranges of the reflected light is selectively incident to the light reception unit. In a case where the light emitted is light (so-called monochromatic light) having a single luminescence peak, the member described above may not be used. The wavelength of light incident to the light reception unit can be set to be in a range of 500 to 700 nm, for example. However, the wavelength of light incident to the light reception unit is not limited to be in the range described above. In addition, the transparent plate-shaped member may be a member having transparency with which light emitted passes, to the extent that the magnetic tape is irradiated with light through this member and interference light is obtained.

The measurement described above can be performed by using a commercially available tape spacing analyzer (TSA) such as Tape Spacing Analyzer manufactured by Micro-Physics, Inc., for example. The spacing measurement of Examples was performed by using Tape Spacing Analyzer manufactured by MicroPhysics, Inc.

In addition, the full width at half maximum of spacing distribution of the invention and the specification is a full width at half maximum (FWHM), when the interference fringe image obtained by the measurement of the spacing described above is divided into 300,000 points, a spacing of each point (distance between the surface of the back coating layer of the magnetic tape and the surface of the transparent plate-shaped member on the magnetic tape side) is acquired, this spacing is shown with a histogram, and this histogram is fit with Gaussian distribution.

Further, the difference $(S_{after}-S_{before})$ is a value obtained by subtracting a mode before the vacuum heating from a mode after the vacuum heating of the 300,000 points.

Hereinafter, the surmise of the inventors regarding the $FWHM_{before}$, the $FWHM_{after}$, and the difference $(S_{after}-S_{before})$ acquired by the method described above will be described.

The lubricant is generally divided broadly into a fluid lubricant and a boundary lubricant. Fatty acid and fatty acid amide described above are known as components which can function as boundary lubricants. The surmise of the inventors regarding the components selected from the group consisting of fatty acid and fatty acid amide is as described above.

In contrast, fatty acid ester is known as a component which can function as a fluid lubricant. It is considered that a fluid lubricant can protect the surface of the back coating layer by forming a liquid film on the surface of the back coating layer. The inventors have thought that the presence of the liquid film of fatty acid ester on the surface of the back coating layer contributes to the protection of the surface of the back coating layer and smooth sliding between the surface of the back coating layer and the drive constituent element. However, the inventors have thought that an excessive amount of fatty acid ester present on the surface of the back coating layer becomes a reason of sticking which causes the deterioration of running stability, due to the formation of a meniscus (liquid crosslinking) between the surface of the back coating layer and the drive constituent element due to fatty acid ester.

In regards to this point, since fatty acid ester is a component having properties of volatilizing by the vacuum heating, the inventors have thought that the difference $(S_{after}-S_{before})$ of a spacing between a state after the vacuum heating (state in which a liquid film of fatty acid ester is volatilized and removed) and a state before the vacuum heating (state in which the liquid film of fatty acid ester is present) can become an index of a thickness of the liquid film formed on the surface of the back coating layer by fatty acid ester. In addition, the inventors have surmised that the presence of the liquid film of fatty acid ester on the surface of the back coating layer, so that the difference $(S_{after}-S_{before})$ is greater than 0 nm and equal to or smaller than 8.0 nm, contributes to the prevention of the sticking and the smooth sliding between the surface of the back coating layer and the drive constituent element.

In addition, as a result of intensive studies, the inventors found that it is effective to increase the uniformity of a contact state between the surface of the back coating layer and the drive constituent element by increasing the uniformity of a surface shape of the back coating layer and increasing the uniformity of a thickness of a liquid film of fatty acid ester, in order to realize the smooth sliding between the surface of the back coating layer and the drive constituent element. In regards to this point, a smaller value of the full width at half maximum of spacing distribution measured by optical interferometry means that a variation in the values of the spacing measured on each part of the surface of the measurement target is small. It is considered that the reason for the variation in values of the spacing measured regarding the surface of the back coating layer of the magnetic tape is a variation in the surface shape of the back coating layer (for example, variation due to the dispersion state of the non-magnetic powder included in the back coating layer) and a variation in the thickness of the liquid film formed by fatty acid ester. The inventors have surmised that the spacing distribution $FWHM_{before}$ measured before the vacuum heating, that is, in a state where the liquid film of fatty acid ester is present on the surface of back coating layer, becomes great as the variation in the surface shape of the back coating layer and the variation in the thickness of the liquid film of fatty acid ester are great, and particularly, the spacing distribution $FWHM_{before}$ is greatly affected by the variation in the thickness of the liquid film of fatty acid ester. In contrast, the inventors have surmised that the spacing distribution $FWHM_{after}$ measured after the vacuum heating, that is, in a state where the liquid film of fatty acid ester is removed from the surface of the back coating layer, becomes great as the variation in the surface shape of the back coating layer is great. That is, the inventors have surmised that small spacing distributions $FWHM_{before}$ and $FWHM_{after}$ mean a small variation in the surface shape of the back coating layer and a small variation in the thickness of the liquid film of fatty acid ester on the surface of the back coating layer. The inventors have thought that it is possible to increase the uniformity of the contact state between the surface of the back coating layer and the drive constituent element by increasing the uniformity of a surface shape of the back coating layer and increasing the uniformity of a thickness of a liquid film of fatty acid ester, so that both spacing distributions $FWHM_{before}$ and $FWHM_{after}$ are greater than 0 nm and equal to or smaller than 10.0 nm. In addition, the inventors have thought that, since fatty acid ester affects some effects to fatty acid and/or fatty acid amide in the vicinity of the boundary surface of the liquid film, the increasing of the uniformity of the thickness of a liquid film of fatty acid ester contributes to the increasing of the uniformity of in-plane distributions of one or more components selected from the group consisting of the fatty acid and fatty acid amide on the extreme outermost surface part of the back coating layer. The inventors have surmised that this point may also contribute to an increase in the uniformity of the contact state between the surface of the back coating layer and the drive constituent element.

However, the above-mentioned description is merely a surmise of the inventors and the invention is not limited thereto.

$FWHM_{before}$ and $FWHM_{after}$

Both the spacing distribution $FWHM_{before}$ before the vacuum heating and the spacing distribution $FWHM_{after}$ after the vacuum heating which are measured on the surface of the back coating layer of the magnetic tape are greater than 0 nm and equal to or smaller than 10.0 nm. The inventors have surmised that the setting of the $FWHM_{before}$ and $FWHM_{after}$ in the range as described above contributes to the improvement of the running stability by allowing smooth sliding between the surface of the back coating layer and the drive constituent element. From a viewpoint of improving the running stability even more, the $FWHM_{before}$ and the $FWHM_{after}$ are preferably equal to or smaller than 9.0 nm, more preferably equal to or smaller than 8.0 nm, even more preferably equal to or smaller than 7.0 nm, still more preferably equal to or smaller than 6.0 nm, and even still more preferably equal to or smaller than 5.0 nm. The $FWHM_{before}$ and the $FWHM_{after}$ can be, for example, equal to or greater than 1.0 nm or equal to or greater than 2.0 nm. Meanwhile, from a viewpoint of improving the running stability, it is preferable that the values thereof are small, and therefore, the values thereof may be smaller than the exemplified values.

The spacing distribution $FWHM_{before}$ before the vacuum heating can be decreased mainly by decreasing the variation in the thickness of the liquid film of fatty acid ester. An example of a specific method will be described later. Meanwhile, the spacing distribution $FWHM_{after}$ after the vacuum heating can be decreased by decreasing the variation in the surface shape of the back coating layer. In order to perform the decreasing described above, it is preferable that the dispersibility of the non-magnetic powder of a back coating layer forming composition is improved. The dispersibility can be, for example, adjusted by the kinds of the non-magnetic powder used in the formation of the back coating layer and a mixing ratio of two or more kinds of the non-magnetic powder, in a case of including two or more kinds thereof. An example of a specific method will be described later.

Difference ($S_{after}-S_{before}$)

The difference ($S_{after}-S_{before}$) of the spacings before and after the vacuum heating measured on the surface of the back coating layer of the magnetic tape is greater than 0 nm and equal to or smaller than 8.0 nm. From a viewpoint of improving the running stability even more, the difference ($S_{after}-S_{before}$) is preferably equal to or greater than 0.1 nm, more preferably equal to or greater than 1.0 nm, and even more preferably equal to or greater than 1.5 nm. In addition, from the same viewpoint, the difference ($S_{after}-S_{before}$) is preferably equal to or smaller than 7.0 nm, more preferably equal to or smaller than 6.0 nm, even more preferably equal to or smaller than 5.0 nm, and still more preferably equal to or smaller than 4.0 nm. The difference ($S_{after}-S_{before}$) can be controlled by the amount of fatty acid ester added to the back coating layer forming composition. As the amount of fatty acid ester added to the back coating layer forming composition increases, the difference ($S_{after}-S_{before}$) tends to increase.

Fatty Acid and Fatty Acid Amide

The magnetic tape includes one or more components selected from the group consisting of fatty acid and fatty acid amide in the back coating layer. The back coating layer may include only one or both of fatty acid and fatty acid amide. The inventors have considered that the surface part C—H derived C concentration may become an index of the amount of the components present in the extreme outermost surface part of the back coating layer as described above.

Examples of fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. Fatty acid may be included in the back coating layer in a state of salt such as metal salt.

As fatty acid amide, amide of various fatty acid described above is used, and specific examples thereof include lauric acid amide, myristic acid amide, palmitic acid amide, and stearic acid amide.

Regarding fatty acid and a derivative of fatty acid (amide and ester which will be described later), a part derived from fatty acid of the fatty acid derivative preferably has a structure which is the same as or similar to that of fatty acid used in combination. As an example, in a case of using fatty acid and stearic acid, it is preferable to use stearic acid amide and/or stearic acid ester.

The content of fatty acid of the back coating layer is, for example, 0.1 to 10.0 parts by mass and preferably 1.0 to 7.0 parts by mass with respect to 100.0 parts by mass of non-magnetic powder included in the back coating layer. In a case where the back coating layer includes two or more kinds of different fatty acids, the content thereof means the total content of the compounds. In the invention and the specification, this point is also applied to the content of other components, unless otherwise noted. In addition, in the invention and the specification, the component described above may be used alone or used in combination of two or more kinds thereof, unless otherwise noted.

The content of fatty acid amide in the back coating layer is, for example, 0.1 to 3.0 parts by mass and is preferably 0.1 to 1.0 part by mass with respect to 100.0 parts by mass of non-magnetic powder included in the back coating layer.

Fatty Acid Ester

The magnetic tape includes fatty acid ester in the back coating layer. The surmise of the inventors regarding fatty acid ester and the spacing and the spacing distributions is as described above. The fatty acid ester may be included alone as one type or two or more types thereof may be included in the back coating layer.

Examples of fatty acid ester include esters of lauric acid, myristic acid, palmitic acid, stearic acid, oleic acid, linoleic acid, linolenic acid, behenic acid, erucic acid, and elaidic acid. Specific examples thereof include butyl myristate, butyl palmitate, butyl stearate (butyl stearate), neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The content of fatty acid ester of the back coating layer is, for example, 0.1 to 10.0 parts by mass and is preferably 1.0 to 5.0 parts by mass with respect to 100.0 parts by mass of the non-magnetic powder included in the back coating layer.

At least one kind of the component consisting of fatty acid, fatty acid amide, and fatty acid ester described above may be included in the magnetic layer of the magnetic tape and/or the non-magnetic layer which is arbitrarily provided. The content of fatty acid of the magnetic layer is, for example, 0 to 10.0 parts by mass, preferably 0.1 to 10.0 parts by mass, and more preferably 1.0 to 7.0 parts by mass with respect to 100.0 parts by mass of ferromagnetic powder. The content of fatty acid amide of the magnetic layer is, for example, 0 to 3.0 parts by mass, preferably 0 to 2.0 parts by mass, and more preferably 0 to 1.0 part by mass with respect to 100.0 parts by mass of ferromagnetic powder. The content of fatty acid ester of the magnetic layer is, for example, 0 to 10.0 parts by mass, preferably 0.1 to 10.0 parts by mass, and more preferably 1.0 to 7.0 parts by mass with respect to 100.0 parts by mass of ferromagnetic powder. For the content of fatty acid, the content of fatty acid amide, and the content of the fatty acid ester of the non-magnetic layer, the description regarding the ferromagnetic powder disclosed regarding the content of the magnetic layer can be applied by replacing the ferromagnetic powder with the non-magnetic powder.

Hereinafter, the magnetic tape described above will be described more specifically.

Magnetic Layer

Ferromagnetic Powder

As the ferromagnetic powder, various powders normally used as the ferromagnetic powder in the magnetic layer of the magnetic tape can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

An average particle size of the ferromagnetic powder is a value measured by the following method with a transmission electron microscope.

The ferromagnetic powder is imaged at a magnification ratio of 100,000 with a transmission electron microscope, the image is printed on printing paper so that the total magnification becomes 500,000, to obtain an image of particles configuring the ferromagnetic powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the ferromagnetic powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss.

In the invention, the average particle size of the ferromagnetic powder and other powder is an average particle size obtained by the method described above, unless otherwise noted. The average particle size shown in Examples which will be described later is measured by using transmission electron microscope H-9000 manufactured by Hitachi, Ltd. as the transmission electron microscope, and image analysis software KS-400 manufactured by Carl Zeiss as the image analysis software. In the invention and the specification, the ferromagnetic powder means an aggregate of a plurality of ferromagnetic particles. The aggregate particles not only include an aspect in which particles configuring the aggregate directly come into contact with each other, but also include an aspect in which a binder or an additive is interposed between the particles. A term "particles" is also used for describing the powder. The same applies to various powders such as the non-magnetic powder of the invention and the specification.

As a method for collecting a sample powder such as ferromagnetic powder from the magnetic layer in order to measure the particle size, a method disclosed in a paragraph of 0015 of JP2011-048878A can be used, for example.

In the invention and the specification, (1) in a case where the shape of the particle observed in the particle image described above is a needle shape, a fusiform shape, or a columnar shape (here, a height is greater than a maximum long diameter of a bottom surface), the size (hereinafter, referred to as a "particle size") of the particles configuring the powder such as ferromagnetic powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of realizing high-density recording and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of realizing high-density recording and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

The content (filling percentage) of the ferromagnetic powder of the magnetic layer is preferably in a range of 50 to 90 mass % and more preferably in a range of 60 to 90 mass %. The components other than the ferromagnetic powder of the magnetic layer are at least a binder and one or more kinds of additives may be arbitrarily included. A high filling percentage of the ferromagnetic powder in the magnetic layer is preferable from a viewpoint of improvement recording density.

Binder and Curing Agent

The magnetic tape includes a binder in the magnetic layer. The binder is one or more kinds of resin. These resins may be a homopolymer or a copolymer. As the binder, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binder even in the back coating layer and/or the non-magnetic layer which will be described later. For the binder described above, description disclosed in paragraphs 0028 to 0031 of JP2010-24113A can be referred to. In addition, a curing agent can also be used together with a resin which can be used as the binder. As the curing agent, polyisocyanate is suitable. For the details of polyisocyanate, descriptions disclosed in paragraphs 0124 and 0125 of JP2011-216149A can be referred to. The amount of the curing agent added to the magnetic layer forming composition can be, for example, 0 to 80.0 parts by mass with respect to 100.0 parts by mass of the binder, and is preferably 50.0 to 80.0 parts by mass, from a viewpoint of improvement of strength of the magnetic layer.

Additives

Additives can be added to the magnetic layer, if necessary. As the additives, a non-magnetic filler, a dispersing agent, a dispersing assistant, a lubricant, an antibacterial agent, an antistatic agent, an antioxidant, or carbon black can be used. The non-magnetic filler is identical to the non-magnetic powder. As the non-magnetic filler, a non-magnetic filler which can function as an abrasive, and a non-magnetic filler (for example, non-magnetic colloidal particles") which can function as a projection formation agent which forms projections suitably protruded from the surface of the magnetic layer can be used. As the additives, commercially available products can be suitably selectively used according to desired properties. As described above, the magnetic layer may include one or more components selected from the group consisting of fatty acid, fatty acid amide, and fatty acid ester.

The magnetic layer described above can be provided directly on the non-magnetic support or indirectly through a non-magnetic layer. The non-magnetic layer and the non-magnetic support will be described later in detail.

Non-Magnetic Layer

The magnetic tape includes a non-magnetic layer including non-magnetic powder and a binder between the non-magnetic support and the magnetic layer. The non-magnetic powder used in the non-magnetic layer may be powder of an inorganic substance (inorganic powder) or powder of an organic substance (organic powder). In addition, carbon black and the like can be used. Examples of the inorganic powder include powders of metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably in a range of 50 to 90 mass % and more preferably in a range of 60 to 90 mass %.

In regards to other details of a binder or additives of the non-magnetic layer, the well-known technology regarding the non-magnetic layer can be applied. In addition, in regards to the type and the content of the binder, and the type and the content of the additive, for example, the well-known technology regarding the magnetic layer can be applied.

As described above, the non-magnetic layer may include one or more components selected from the group consisting of fatty acid, fatty acid amide, and fatty acid ester.

In the invention and the specification, the non-magnetic layer also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Back Coating Layer

Non-Magnetic Powder

For the types of the non-magnetic powder included in the back coating layer, the description regarding the non-magnetic powder included in the non-magnetic layer can be referred to. The non-magnetic powder included in the back coating layer is preferably one or more non-magnetic powders selected from the group consisting of inorganic powder and carbon black. Examples of the inorganic powder include inorganic powder such as iron oxide such as α-iron oxide, titanium oxide such as titanium dioxide, cerium oxide, tin oxide, tungsten oxide, ZnO, $ZrO_2$, $SiO_2$, $Cr_2O_3$, α-alumina, β-alumina, γ-alumina, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, and silicon carbide. The preferred inorganic powder is inorganic oxide powder, α-iron oxide and titanium oxide are more preferable, and α-iron oxide is even more preferable.

Generally, the inorganic powder tends to have excellent dispersibility of the back coating layer forming composition, compared to carbon black. The increasing of the dispersibility of the non-magnetic powder in the back coating layer forming composition may contribute to a decrease in variation of the surface shape of the back coating layer. Accordingly, as an adjusting method of the spacing distribution $FWHM_{after}$ after the vacuum heating which may decrease, as a variation of the surface shape of the back coating layer is decreased, a method of adjusting the mixing ratio can be used, in a case of including the kinds of the non-magnetic powder included in the back coating layer and the two or more kinds of the non-magnetic powder. For example, it is preferable to use the inorganic powder as the main powder (non-magnetic powder most included among the non-magnetic powders, based on weight) of the non-magnetic powder of the back coating layer. In a case where the non-magnetic powder included in the back coating layer is one or more non-magnetic powder selected from the group consisting of the inorganic powder and carbon black, the content of the inorganic powder with respect to 100.0 parts by mass of the total amount of the non-magnetic powder is preferably in a range of greater than 50.0 parts by mass to equal to or less than 100.0 parts by mass, more preferably in a range of 60.0 parts by mass to 100.0 parts by mass, even more preferably in a range of 70.0 parts by mass to 100.0 parts by mass, and still more preferably in a range of 80.0 parts by mass to 100.0 parts by mass.

An average particle size of the non-magnetic powder can be, for example, in a range of 10 to 200 nm. An average particle size of the inorganic powder is preferably in a range of 50 to 200 nm and more preferably in a range of 80 to 150 nm. Meanwhile, an average particle size of carbon black is preferably in a range of 10 to 50 nm and more preferably in a range of 15 to 30 nm.

In addition, the dispersibility of the non-magnetic powder in the back coating layer forming composition can be increased by using a well-known dispersing agent and the reinforcing the dispersion conditions.

A preferred aspect of the adjustment method of the spacing distribution $FWHM_{before}$ before the vacuum heating will be described later.

The details of the component selected from the group consisting of the fatty acid and fatty acid amide, and fatty acid ester included in the back coating layer are as described above.

In regards to the binder included in the back coating layer and various additives which can be arbitrarily included in the back coating layer, a well-known technology regarding the treatment of the magnetic layer and/or the non-magnetic layer can be applied.

Non-Magnetic Support

Next, the non-magnetic support (hereinafter, also simply referred to as a "support") will be described.

As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Various Thickness

The thickness of the non-magnetic support is preferably 3.00 to 20.00 μm, more preferably 3.00 to 10.00 even more preferably 3.00 to 6.00 μm, and particularly preferably 3.00 to 4.50 μm.

A thickness of the magnetic layer can be optimized in accordance with saturation magnetization quantity of the magnetic head used, a head gap length, or a band of a recording signal. The thickness of the magnetic layer is normally 0.01 μm to 0.15 μm, and is preferably 0.02 μm to 0.12 μm and more preferably 0.03 μm to 0.10 μm, from a viewpoint of realizing high-density recording. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

A thickness of the non-magnetic layer is, for example, equal to or greater than 0.05 μm, preferably equal to or greater than 0.07 μm, and more preferably equal to or greater than 0.10 μm. Meanwhile, the thickness of the non-magnetic layer is preferably equal to or smaller than 0.80 μm and more preferably equal to or smaller than 0.50 μm.

The thickness of the back coating layer is as described above. The thinning of the back coating layer is one of methods for thinning the magnetic tape. From a viewpoint of increasing the recording capacity for 1 reel of the magnetic tape cartridge by thinning the magnetic tape, the total thickness of the magnetic tape is preferably equal to or smaller than 6.00 μm and more preferably equal to or smaller than 5.00 μm. Meanwhile, from a viewpoint of ease of handling (handling properties) of the magnetic tape, the total thickness of the magnetic tape is preferably equal to or greater than 1.00 µm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scan electron microscope. In the cross section observation, various thicknesses can be acquired as a thickness acquired at one position of the cross section in the thickness direction, or an arithmetical mean of thicknesses acquired at a plurality of positions of two or more positions. In addition, the thickness of each layer may be acquired as a designed thickness calculated according to the manufacturing conditions.

Manufacturing Step

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binder normally used in the coating type magnetic recording medium, the each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of the each layer forming composition is not particularly limited, and can be set to be the same as that of the each layer forming composition of a typical coating type magnetic recording medium.

In the preparing step of the each layer forming composition, a well-known manufacturing technology can be used. In addition, steps of preparing the each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. In the kneading step, an open kneader, a continuous kneader, a pressure kneader, or a kneader having a strong kneading force such as an extruder is preferably used. The details of the kneading step of these kneaders are disclosed in JP1989-106338A (JP-H01-106338A) and JP1989-79274A (JP-H01-79274A). In addition, in order to disperse the each layer forming composition, glass beads and/or other beads can be used. As such dispersion beads, zirconia beads, titania beads, and steel beads which are dispersion beads having high specific gravity are suitable. These dispersion beads can be used by optimizing a bead diameter and a filling percentage. As a dispersion device, a well-known dispersion device can be used.

Coating Step, Cooling Step, Heating and Drying Step, and Vibration Imparting

The magnetic layer can be formed by directly applying the magnetic layer forming composition onto the non-magnetic support or by performing multilayer coating of the magnetic layer forming composition with the non-magnetic layer forming composition in order or at the same time. For details of the coating for forming each layer, a description disclosed in a paragraph 0066 of JP2010-231843A can be referred to.

The back coating layer is preferably formed on the surface of the non-magnetic support on a side opposite to the surface where the magnetic layer is formed, after forming the back coating layer. The back coating layer can be formed through a coating step of applying a back coating layer forming composition onto a surface of a non-magnetic support to form a coating layer, and a heating and drying step of drying the formed coating layer by a heating process. It is preferable that the cooling step of cooling the coating layer is performed between the coating step and the heating and drying step, in order to adjust the surface part C—H derived C concentration to be in the range described above, in the magnetic tape including the back coating layer including one or more components selected from the group consisting of fatty acid and fatty acid amide. The reason thereof is not clear, but the inventors has surmised that the reason thereof is because the components (fatty acid and/or fatty acid amide) are moved to the surface of the back coating layer at the time of solvent volatilization of the heating and drying step, by cooling the coating layer of the back coating layer forming composition before the heating and drying step. However, this is merely the surmise, and the invention is not limited thereto.

In addition, as a preferred manufacturing method, a manufacturing method of including a step of applying vibration to the back coating layer can be used, in order to improve the uniformity of the thickness of the liquid film of fatty acid ester on the surface of the back coating layer. The inventors have surmised that, by adding vibration, the liquid film formed on the surface of the back coating layer by fatty acid ester flows and the uniformity of the thickness of the liquid film is improved.

That is, the magnetic tape can be manufactured by a manufacturing method of forming the back coating layer by applying and drying the back coating layer forming composition onto the non-magnetic support, and applying vibration to the formed back coating layer (imparting vibration). Means for applying vibration are not particularly limited. For example, the vibration can be applied to the back coating layer, by bringing the surface of the non-magnetic support, provided with the back coating layer formed, on a side opposite to the back coating layer to come into contact with a vibration imparting unit. The non-magnetic support, provided with the back coating layer formed, may run while coming into contact with a vibration imparting unit. The vibration imparting unit, for example, includes an ultrasonic vibrator therein, and accordingly, vibration can be applied to a product coming into contact with the unit. It is possible to adjust the vibration applied to the back coating layer by a vibration frequency, and strength of the ultrasonic vibrator, and/or the contact time with the vibration imparting unit. For example, the contact time can be adjusted by a running speed of the non-magnetic support, provided with the back coating layer formed, while coming into contact with the vibration imparting unit. The vibration imparting conditions are not particularly limited, and may be set so as to control the spacing distribution, particularly, the spacing distribution $FWHM_{before}$ before vacuum heating. In order to set the vibration imparting conditions, a preliminary experiment can be performed before the actual manufacturing, and the conditions can be optimized.

Hereinafter, a specific aspect of the manufacturing method will be described with reference to FIG. 1. However, the invention is not limited to the following specific aspect.

FIG. 1 is a step schematic view showing a specific aspect of the step for manufacturing the magnetic tape including a non-magnetic layer and a magnetic layer in this order on one surface of a non-magnetic support and including a back coating layer on the other surface thereof. In the aspect shown in FIG. 1, an operation of sending a non-magnetic support (elongated film) from a sending part and winding the non-magnetic support around a winding part is continuously performed, and various processes of coating, drying, and orientation are performed in each part or each zone shown in FIG. 1, and thus, it is possible to sequentially form a non-magnetic layer and a magnetic layer on one surface of the running non-magnetic support by a multilayer coating and to form a back coating layer on the other surface thereof. The manufacturing step, which is normally performed for manufacturing the coating type magnetic recording medium, can be performed in the same manner except for including a cooling zone and including a vibration imparting part.

The back coating layer forming composition is applied onto the non-magnetic support sent from the sending part in a first coating part to form a coating layer (coating step of back coating layer forming composition).

After the coating step, a coating layer of the back coating layer forming composition formed in the coating step is cooled in a cooling zone (cooling step). For example, it is possible to perform the cooling step by allowing the non-magnetic support on which the coating layer is formed to pass through a cooling atmosphere. An atmosphere temperature of the cooling atmosphere is preferably in a range of −10° C. to 0° C. and more preferably in a range of −5° C. to 0° C. The time for performing the cooling step (for example, a time during which an arbitrary part of the coating layer is delivered to and sent from the cooling zone (hereinafter, also referred to as a "staying time")) is not particularly limited, and when the staying time is long, the surface part C—H derived C concentration tends to be increased. Thus, the staying time is preferably adjusted by performing a preliminary experiment if necessary, so that the surface part C—H derived C concentration in the range described above is realized. In the cooling step, cooled air may blow onto the surface of the coating layer.

After that, in a first heating process zone, the coating layer after the cooling step is heated and dried (heating and drying step). The heating and drying process can be performed by causing the non-magnetic support including the coating layer after the coating step to pass through the heated atmosphere. An atmosphere temperature of the heated atmosphere, here is, for example, approximately 60° to 140°. Here, the atmosphere temperature may be a temperature at which the solvent is volatilized and the coating layer is dried, and the atmosphere temperature is not limited to the range described above. In addition, the heated air may blow onto the surface of the coating layer. The points described above are also applied to a heating and drying step of a second heating process zone and a heating and drying step of a third heating process zone which will be described later, in the same manner.

Next, in a vibration imparting part, vibration is imparted to the back coating layer dried in the heating and drying step. The details of the vibration imparting are as described above.

Next, in a second coating part, the coating of the non-magnetic layer forming composition is performed to form the coating layer (coating step of the non-magnetic layer forming composition). The formed coating layer is heated and dried in the second heating process zone (heating and drying step).

Next, in a third coating part, the magnetic layer forming composition is applied onto the surface of the non-magnetic layer formed by performing the heating and drying step in the second heating process zone to form a coating layer (coating step of the magnetic layer forming composition).

After that, while the coating layer of the magnetic layer forming composition is wet, an orientation process of the ferromagnetic powder in the coating layer is performed in an orientation zone. For the orientation process, a description disclosed in a paragraph 0067 of JP2010-231843A can be referred to.

The coating layer after the orientation process is subjected to the heating and drying step in the third heating process zone.

By doing so, it is possible to obtain a magnetic tape including the non-magnetic layer and the magnetic layer in this order on one surface of the non-magnetic support, and the back coating layer on the other surface. The obtained magnetic tape may be arbitrarily subjected to various post processes (various surface treatment such as a calender process), after being wound around the winding part. For the post processes, well-known technologies regarding the manufacturing of the coating type magnetic recording medium can be applied without limitation.

The magnetic tape is a magnetic tape which can exhibit excellent running stability in the low temperature and high humidity environment. As an index of the running stability of the magnetic tape, a position error signal (PES) disclosed in Examples which will be described later can be used. The magnetic tape according to one aspect of the invention can show, for example, a PES equal to or smaller than 70 nm.

EXAMPLES

Hereinafter, the invention will be described with reference to Examples. However, the invention is not limited to aspects shown in Examples. "Parts" and "%" in the following description mean "parts by mass" and "mass %", unless otherwise noted.

The weight-average molecular weight shown hereinafter is a value obtained by performing polystyrene conversion of a value measured by gel permeation chromatography (GPC) under the following measurement conditions.

GPC device: HLC-8120 (manufactured by Tosoh Corporation)
Column: TSK gel Multipore HXL-M (manufactured by Tosoh Corporation, 7.8 mmID (inner diameter)×30.0 cm)
Eluent: Tetrahydrofuran (THF)

Example 1

1. Preparation of Alumina Dispersion
3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a $SO_3Na$ group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of alumina powder (HIT-70 manufactured by Sumitomo Chemical Co., Ltd.) having a gelatinization ratio of 65% and a BET specific surface area of 30 $m^2/g$, and dispersed in the presence of zirconia beads by a paint shaker for 5 hours. After the dispersion, the dispersion liquid and the beads were separated by a mesh and an alumina dispersion was obtained.

2. Magnetic Layer Forming Composition List
Magnetic Solution
Ferromagnetic powder (see Table 5): 100.0 parts
SO$_3$Na group-containing polyurethane resin: 14.0 parts
Weight-average molecular weight: 70,000, SO$_3$Na group: 0.2 meq/g
Cyclohexanone: 150.0 parts
Methyl ethyl ketone: 150.0 parts
Abrasive liquid
Alumina dispersion prepared in the section 1: 6.0 parts
Silica Sol
Colloidal silica (average particle size of 100 nm): 2.0 parts
Methyl ethyl ketone: 1.4 parts
Other Components
Stearic acid: 2.0 parts
Stearic acid amide: 0.2 parts
Butyl stearate: 2.0 parts
Polyisocyanate (CORONATE (registered trademark) manufactured by Nippon Polyurethane Industry): 2.5 parts
Finishing Additive Solvent
Cyclohexanone: 200.0 parts
Methyl ethyl ketone: 200.0 parts
3. Non-Magnetic Layer Forming Composition List
Inorganic powder: α-iron oxide: 100.0 parts
Average particle size (average long axis length): 10 nm
Average acicular ratio: 1.9
BET specific surface area: 75 m$^2$/g
Carbon black: 20.0 parts
Average particle size: 20 nm
SO$_3$Na group-containing polyurethane resin: 18.0 parts
Weight-average molecular weight: 70,000, SO$_3$Na group: 0.2 meq/g
Stearic acid: 2.0 parts
Stearic acid amide: 0.2 parts
Butyl stearate: 1.5 parts
Cyclohexanone: 300.0 parts
Methyl ethyl ketone: 300.0 parts
4. Back Coating Layer Forming Composition List
Inorganic powder: α-iron oxide: see Table 5
Average particle size (average long axis length): 150 nm
Average acicular ratio: 7
BET specific surface area: 52 m$^2$/g
Carbon black: see Table 5
Average particle size: 20 nm
Vinyl chloride copolymer: 13.0 parts
Sulfonate group-containing polyurethane resin: 6.0 parts
Phenylphosphonic acid: 3.0 parts
Methyl ethyl ketone: 155.0 parts
Stearic acid: see Table 5
Stearic acid amide: see Table 5
Butyl stearate: see Table 5
Polyisocyanate: 5.0 parts
Cyclohexanone: 355.0 parts
5. Preparation of Each Layer Forming Composition The magnetic layer forming composition was prepared by the following method. The magnetic solution was prepared by dispersing (beads-dispersing) each component with a batch type vertical sand mill for 24 hours. As the dispersion beads, zirconia beads having a bead diameter of 0.5 mm were used. The prepared magnetic solution and the abrasive liquid were mixed with other components (silica sol, other components, and finishing additive solvent) and beads-dispersed for 5 minutes by using the sand mill, and a process (ultrasonic dispersion) was performed with a batch type ultrasonic device (20 kHz, 300 W) for 0.5 minutes. After that, the filtering was performed by using a filter having an average hole diameter of 0.5 μm, and the magnetic layer forming composition was prepared.

The non-magnetic layer forming composition was prepared by the following method.

Each component excluding stearic acid, stearic acid amide, butyl stearate, cyclohexanone, and methyl ethyl ketone was dispersed by using batch type vertical sand mill for 24 hours to obtain a dispersion liquid. As the dispersion beads, zirconia beads having a bead diameter of 0.1 mm were used. After that, the remaining components were added into the obtained dispersion liquid and stirred with a dissolver. The dispersion liquid obtained as described above was filtered with a filter having an average hole diameter of 0.5 μm and a non-magnetic layer forming composition was prepared.

The back coating layer forming composition was prepared by the following method.

Each component excluding stearic acid, stearic acid amide, butyl stearate, polyisocyanate, and cyclohexanone was kneaded and diluted by an open kneader, and subjected to a dispersing process of 12 passes, with a transverse beads mill dispersion device and zirconia beads having a bead diameter of 1 mm, by setting a bead filling percentage as 80 volume %, a circumferential speed of rotor tip as 10 m/sec, and a retention time for 1 pass as 2 minutes. After that, the remaining components were added into the obtained dispersion liquid and stirred with a dissolver. The dispersion liquid obtained as described above was filtered with a filter having an average hole diameter of 1 μm and a back coating layer forming composition was prepared.

6. Manufacturing of Magnetic Tape

The back coating layer forming composition prepared in the section 5. was applied to one surface of a support made of polyethylene naphthalate having a thickness shown in Table 5 so that the thickness after the drying becomes the thickness shown in Table 5, to form a coating layer. The cooling step was performed by passing the formed coating layer through the cooling zone in which the atmosphere temperature is adjusted to 0° C. for the staying time shown in Table 5 while the coating layer is wet, and then the coating layer was dried in the first heating process zone (atmosphere temperature of 100° C.), to form a back coating layer.

Figure 2:
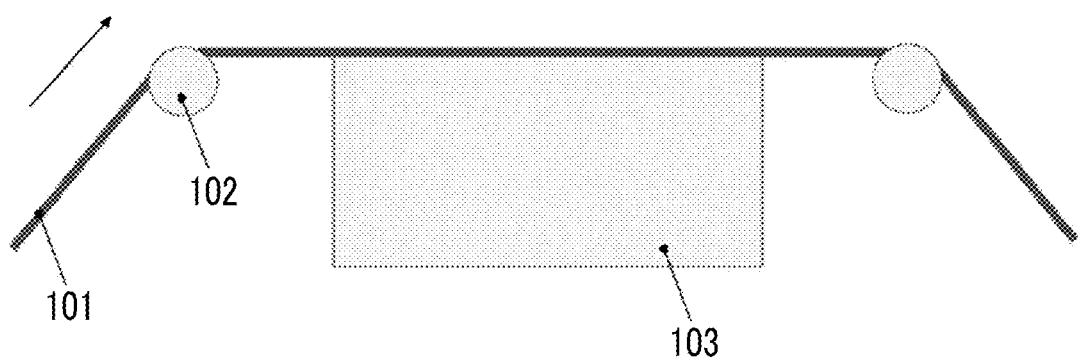
FIG. 2 is a schematic configuration diagram of a vibration imparting device used in Examples.

Then, vibration was applied to the back coating layer in the vibration imparting part. Specifically, the support on which the back coating layer was formed was installed in the vibration imparting device shown in FIG. 2 so that the surface on a side opposite to the surface where the back coating layer was formed, comes into contact with the vibration imparting unit, and the support (in FIG. 2, reference numeral 101) on which the back coating layer was formed was transported at a transportation speed of 0.5 m/sec to apply vibration to the back coating layer. In FIG. 2, a reference numeral 102 denotes a guide roller (a reference numeral 102 denotes one of the two guide rollers), a reference numeral 103 denotes the vibration imparting device (vibration imparting unit including the ultrasonic vibrator), and an arrow denotes the transportation direction. The time from the start of the contact of the arbitrary portion of the support, provided with the back coating layer formed, with the vibration imparting unit until the end of the contact is shown in Table 5 as the vibration imparting time. The vibration imparting unit used includes an ultrasonic vibrator therein. The vibration was imparted by setting a vibration frequency and the intensity of the ultrasonic vibrator as the values shown in Table 5.

After that, the non-magnetic layer forming composition prepared in the section 5. was applied onto the surface of the support, provided with the back coating layer formed, on a side opposite to the surface, provided with the back coating layer formed, so that the thickness after the drying becomes the thickness shown in Table 5 in the second coating part, to form a coating layer. Then, the heating and drying step was performed by allowing the support, provided with the coating layer formed, to pass through the second heating process zone at an atmosphere temperature of 100° C., and a non-magnetic layer was formed.

After that, the magnetic layer forming composition prepared in the section 5. was applied onto the surface of the non-magnetic layer so that the thickness after the drying becomes the thickness shown in Table 5 in the third coating part, and a coating layer was formed. A homeotropic alignment process was performed in the orientation zone by applying a magnetic field having a magnetic field strength of 0.3 T to the surface of the coating layer of the magnetic layer forming composition in a vertical direction while the coating layer is wet (not dried), and the coating layer was dried in the third heating process zone (atmosphere temperature of 100° C.).

After that, the surface smoothing treatment (calender process) was performed with a calender roll configured of only a metal roll, at a speed of 100 m/min, linear pressure of 300 kg/cm (294 kN/m), and a surface temperature of a calender roll of 100° C. Then, the heating treatment was performed in the environment of the atmosphere temperature of 70° C. for 36 hours. After the heating treatment, the slitting was performed so as to have a width of ½ inches (0.0127 meters), and the magnetic tape was manufactured.

Examples 2 to 9 and Comparative Examples 1 to 9

A magnetic tape was manufactured in the same manner as in Example 1, except one or more items of the list of the back coating layer forming composition, the thickness of the back coating layer, the back coating layer formation conditions, and the ferromagnetic powder were changed as shown in Table 5. The vibration imparting time was adjusted by changing the transportation speed of the support, provided with the back coating layer.

In Table 5, "BaFe" indicates ferromagnetic hexagonal ferrite powder having an average particle size of 24 nm and "MP" indicates ferromagnetic metal powder having an average particle size of 30 nm.

A ratio of inorganic powder/carbon black of the back coating layer disclosed in Table 5 is the content of each powder based on mass with respect to the total content 100.0 parts by mass of the inorganic powder and carbon black.

In Table 5, in Comparative Examples in which "not performed" is disclosed in a column of the ultrasonic vibration imparting conditions, a magnetic tape was manufactured by a manufacturing step not including a vibration imparting part.

The thickness of each layer and the non-magnetic support of each magnetic tape of Examples and Comparative Examples was acquired by the following method, and it was confirmed that the thickness is the value shown in Table 5.

The cross section of the magnetic tape in a thickness direction was exposed by an ion beam, and then, the cross section observation of the exposed cross section was performed with a scanning electron microscope. Various thicknesses were acquired as an arithmetical mean of thicknesses acquired at two positions in the thickness direction, in the cross section observation.

The following evaluations were performed regarding each magnetic tape of Examples and Comparative Examples manufactured as described above.

Physical Properties Evaluation Method of Magnetic Tape

1. Spacing Distributions $FWHM_{before}$ and $FWHM_{after}$ Before and after Vacuum Heating The spacing distributions $FWHM_{before}$ and $FWHM_{after}$ before and after vacuum heating were acquired by the following method by using a tape spacing analyzer (TSA) (manufactured by MicroPhysics, Inc.).

In a state where a glass sheet included in the TSA was disposed on the surface of the back coating layer of the magnetic tape, a hemisphere was pressed against the surface of the magnetic layer of the magnetic tape at pressure of $5.05 \times 10^4$ N/m (0.5 atm) by using a hemisphere made of urethane included in the TSA as a pressing member. In this state, a given region (150,000 to 200,000 $\mu m^2$) of the surface of the back coating layer of the magnetic tape was irradiated with white light from a stroboscope included in the TSA through the glass sheet, and the obtained reflected light was received by a charge-coupled device (CCD) through an interference filter (filter selectively passing light at a wavelength of 633 nm), and thus, an interference fringe image generated on the uneven part of the region was obtained.

This image was divided into 300,000 points, a distance (spacing) between the surface of the glass sheet on the magnetic tape side and the surface of the back coating layer of the magnetic tape was acquired, and the full width at half maximum of spacing distribution was full width at half maximum, when this spacing was shown with a histogram, and this histogram was fit with Gaussian distribution.

The vacuum heating was performed by storing the magnetic tape in a vacuum constant temperature drying machine with a degree of vacuum of 200 Pa to 0.01 Mpa and at inner atmosphere temperature of 70° C. to 90° C. for 24 hours.

2. Difference ($S_{after}-S_{before}$)

The difference ($S_{after}-S_{before}$) was a value obtained by subtracting a mode of the histogram before the vacuum heating from a mode of the histogram after the vacuum heating obtained in the section 1.

3. Surface Part C—H Derived C Concentration

The X-ray photoelectron spectroscopic analysis was performed regarding the surface of the back coating layer of the magnetic tape (measurement region: 300 $\mu m \times 700$ $\mu m$) by the following method using an ESCA device, and a surface part C—H derived C concentration was calculated from the analysis result.

Analysis and Calculation Method

All of the measurement (1) to (3) described below were performed under the measurement conditions shown in Table 1.

TABLE 1

| Device | AXIS-ULTRA manufactured by Shimadzu Corporation |
|---|---|
| Excitation X-ray source | Monochromatic Al-Kα ray (output: 15 kV, 20 mA) |
| Analyzer mode | Spectrum |
| Lens mode | Hybrid (analysis area: 300 $\mu m$ × 700 $\mu m$) |
| Neutralization electron gun for charge correction (Charge neutraliser) | ON (used) |
| Photoelectron take-off angle (take-off angle) | 10 deg. (angle formed by a detector and a sample surface) |

(1) Wide Scan Measurement

A wide scan measurement (measurement conditions: see Table 2) was performed regarding the surface of the back coating layer of the magnetic tape with the ESCA device, and the types of the detected elements were researched (qualitative analysis).

TABLE 2

| Scan range | Pass Energy | Energy resolution (Step) | Capturing time (Dwell) | Number of integration times (Sweeps) |
|---|---|---|---|---|
| 0 to 1200 eV | 160 eV | 1 eV/step | 100 ms/step | 5 |

(2) Narrow Scan Measurement

All elements detected in (1) described above were subjected to narrow scan measurement (measurement conditions: see Table 3). An atom concentration (unit: atom %) of each element detected was calculated from a peak surface area of each element by using software for a data process attached to the device (Vision 2.2.6). Here, the C concentration was also calculated.

TABLE 3

| Spectra[Note 1] | Scan range | Pass Energy | Energy resolution (Step) | Capturing time (Dwell) | Number of integration times (Sweeps)[Note 2] |
|---|---|---|---|---|---|
| C1s | 276 to 296 eV | 80 eV | 0.1 eV/step | 100 ms/step | 3 |
| Cl2p | 190 to 212 eV | 80 eV | 0.1 eV/step | 100 ms/step | 5 |
| N1s | 390 to 410 eV | 80 eV | 0.1 eV/step | 100 ms/step | 5 |
| O1s | 521 to 541 eV | 80 eV | 0.1 eV/step | 100 ms/step | 3 |
| Fe2p | 700 to 740 eV | 80 eV | 0.1 eV/step | 100 ms/step | 3 |
| Ba3d | 765 to 815 eV | 80 eV | 0.1 eV/step | 100 ms/step | 3 |
| Al2p | 64 to 84 eV | 80 eV | 0.1 eV/step | 100 ms/step | 5 |
| Y3d | 148 to 168 eV | 80 eV | 0.1 eV/step | 100 ms/step | 3 |
| P2p | 120 to 140 eV | 80 eV | 0.1 eV/step | 100 ms/step | 5 |
| Zr3d | 171 to 191 eV | 80 eV | 0.1 eV/step | 100 ms/step | 5 |
| Bi4f | 151 to 171 eV | 80 eV | 0.1 eV/step | 100 ms/step | 3 |
| Sn3d | 477 to 502 eV | 80 eV | 0.1 eV/step | 100 ms/step | 5 |
| Si2p | 90 to 110 eV | 80 eV | 0.1 eV/step | 100 ms/step | 5 |
| S2p | 153 to 173 eV | 80 eV | 0.1 eV/step | 100 ms/step | 5 |

[Note 1] Spectra shown in Table 3 (element type) are examples, and in a case where an element not shown in Table 3 is detected by the qualitative analysis of the section (1), the same narrow scan measurement is performed in a scan range including entirety of spectra of the elements detected.
[Note 2] The spectra having excellent signal-to-noise ratio (S/N ratio) were measured when the number of integration times is set as three times. However, even when the number of integration times regarding the entirety of spectra is set as five times, the quantitative results are not affected.

(3) Acquiring of C1s Spectra

The C1s spectra were acquired under the measurement conditions disclosed in Table 4. Regarding the acquired C1s spectra, after correcting a shift (physical shift) due to a sample charge by using software for a data process attached to the device (Vision 2.2.6), a fitting process (peak resolution) of the C1s spectra was performed by using the software described above. In the peak resolution, the fitting of C1s spectra was performed by a nonlinear least-squares method using a Gauss-Lorentz complex function (Gaussian component: 70%, Lorentz component: 30%), and a percentage (peak area ratio) of the C—H peak occupying the C1s spectra was calculated. A C—H derived C concentration was calculated by multiplying the calculated C—H peak area ratio by the C concentration acquired in (2) described above.

TABLE 4

| Spectra | Scan range | Pass Energy | Energy resolution (Step) | Capturing time (Dwell) | Number of integration times (Sweeps) |
|---|---|---|---|---|---|
| C1s | 276 to 296 eV | 10 eV | 0.1 eV/step | 200 ms/step | 20 |

An arithmetical mean of values obtained by performing the above-mentioned process at different positions of the surface of the back coating layer of the magnetic tape three times was set as the surface part C—H derived C concentration.

Performance Evaluation Method of Magnetic Tape

Evaluation of Running Stability

The running stability (PES) of each magnetic tape of Examples and Comparative Examples was evaluated by the following method in the low temperature and high humidity environment at a temperature of 13° C. and relative humidity of 80%.

A servo pattern was formed on the magnetic layer of each magnetic tape of Examples and Comparative Examples by using a servo writer. Then, each magnetic tape of Examples and Comparative Examples was allowed to run in a reel tester, a servo signal was acquired and analyzed from the magnetic tape by a digital storage oscilloscope, and thus, a degree (PES) that the magnetic head based on Linear Tape-Open Generation 6 (LTO G6) could not follow the vertical motion of the magnetic tape was acquired.

The PES measured by the method described above is a value indicating the running stability and, as the value is small, the excellent running stability is obtained. When the PES is equal to or smaller than 70 nm, it is possible to determine that excellent running stability is obtained.

In Comparative Example 7, during the running in the reel tester, it was difficult to bring the surface of the magnetic layer to come into contact with and slide on the magnetic head (running trouble) due to the effect of attached materials attached to the surface of the magnetic layer, and thus, the evaluation was stopped. It is surmised that the attached materials of the surface of the magnetic layer are the cut scraps attached to the surface of the magnetic layer in the reel tester, which are generated by cutting of the surface of the back coating layer due to the sliding with the constituent element of the reel tester.

In Comparative Example 8, during the running in the reel tester, it was difficult to bring the surface of the magnetic layer to come into contact with and slide on the magnetic head (running trouble) due to occurrence of the sticking between the surface of the magnetic layer and the magnetic head, and thus, the evaluation was stopped.

In Table 5, "Unevaluable" was disclosed in the columns of the evaluation result of the PES in Comparative Example 7 and Comparative Example 8.

The results described above are shown in Table 5.

TABLE 5

| | | Example 1 | Example 2 | Example 3 | Example 4 | Example 5 |
|---|---|---|---|---|---|---|
| | Ferromagnetic powder | BaFe | BaFe | BaFe | BaFe | BaFe |
| | Magnetic layer thickness | 0.10 μm | 0.10 μm | 0.10 μm | 0.10 μm | 0.10 μm |
| | Non-magnetic layer thickness | 0.40 μm | 0.40 μm | 0.40 μm | 0.40 μm | 0.40 μm |
| | Non-magnetic support thickness | 4.00 μm | 4.00 μm | 4.00 μm | 4.00 μm | 4.00 μm |
| | Back coating layer thickness | 0.20 μm | 0.20 μm | 0.20 μm | 0.20 μm | 0.20 μm |
| Back coating layer forming composition | Ratio of inorganic powder/carbon black | 80.0/20.0 | 80.0/20.0 | 80.0/20.0 | 80.0/20.0 | 80.0/20.0 |
| | Stearic acid/part | 2.0 | 2.0 | 2.0 | 2.0 | 2.0 |
| | Stearic acid amide/part | 0.2 | 0.2 | 0.2 | 0.2 | 0.2 |
| | Butyl stearate/part | 1.5 | 1.5 | 1.5 | 1.5 | 1.5 |
| Back coating layer formation conditions | Cooling zone staying time | 180 sec | 180 sec | 180 sec | 5 sec | 50 sec |
| | Vibration imparting conditions | Vibration imparting time: 2.0 seconds Vibration frequency: 30 kHz Strength: 100 W | Vibration imparting time: 1.4 seconds Vibration frequency: 30 kHz Strength: 100 W | Vibration imparting time: 0.8 seconds Vibration frequency: 30 kHz Strength: 100 W | Vibration imparting time: 2.0 seconds Vibration frequency: 30 kHz Strength: 100 W | Vibration imparting time: 2.0 seconds Vibration frequency: 30 kHz Strength: 100 W |
| Back coating layer | Surface part C—H derived C concentration | 60 atom % | 60 atom % | 60 atom % | 40 atom % | 50 atom % |
| | Difference ($S_{after} - S_{before}$) | 2.0 nm | 2.0 nm | 2.0 nm | 2.0 nm | 2.0 nm |
| | $FWHM_{before}$ | 2.0 nm | 5.0 nm | 8.0 nm | 2.0 nm | 2.0 nm |
| | $FWHM_{after}$ | 8.0 nm | 8.0 nm | 8.0 nm | 8.0 nm | 8.0 nm |
| PES (temperature of 13° C., relative humidity of 80%) | | 59 nm | 63 nm | 66 nm | 66 nm | 63 nm |

| | | Example 6 | Example 7 | Example 8 | Example 9 |
|---|---|---|---|---|---|
| | Ferromagnetic powder | BaFe | MP | BaFe | BaFe |
| | Magnetic layer thickness | 0.10 μm | 0.10 μm | 0.10 μm | 0.10 μm |
| | Non-magnetic layer thickness | 0.40 μm | 0.40 μm | 0.40 μm | 0.40 μm |
| | Non-magnetic support thickness | 4.00 μm | 4.00 μm | 4.00 μm | 4.00 μm |
| | Back coating layer thickness | 0.20 μm | 0.20 μm | 0.20 μm | 0.20 μm |
| Back coating layer forming composition | Ratio of inorganic powder/carbon black | 80.0/20.0 | 80.0/20.0 | 80.0/20.0 | 100/0 |
| | Stearic acid/part | 2.0 | 2.0 | 2.0 | 2.0 |
| | Stearic acid amide/part | 0.2 | 0.2 | 0.2 | 0.2 |
| | Butyl stearate/part | 1.5 | 1.5 | 2.5 | 1.5 |
| Back coating layer formation conditions | Cooling zone staying time | 5 sec | 180 sec | 180 sec | 180 sec |
| | Vibration imparting conditions | Vibration imparting time: 0.8 seconds Vibration frequency: 30 kHz Strength: 100 W | Vibration imparting time: 2.0 seconds Vibration frequency: 30 kHz Strength: 100 W | Vibration imparting time: 2.0 seconds Vibration frequency: 30 kHz Strength: 100 W | Vibration imparting time: 2.0 seconds Vibration frequency: 30 kHz Strength: 100 W |
| Back coating layer | Surface part C—H derived C concentration | 40 atom % | 60 atom % | 60 atom % | 60 atom % |
| | Difference ($S_{after} - S_{before}$) | 2.0 nm | 2.0 nm | 6.0 nm | 2.0 nm |

TABLE 5-continued

| | | | | |
|---|---|---|---|---|
| FWHM$_{before}$ | 8.0 nm | 2.0 nm | 2.0 nm | 2.0 nm |
| FWHM$_{after}$ | 8.0 nm | 8.0 nm | 8.0 nm | 2.0 nm |
| PES (temperature of 13° C., relative humidity of 80%) | 69 nm | 60 nm | 66 nm | 58 nm |

| | | Comparative Example 1 | Comparative Example 2 | Comparative Example 3 | Comparative Example 4 | Comparative Example 5 |
|---|---|---|---|---|---|---|
| Ferromagnetic powder | | BaFe | BaFe | BaFe | BaFe | BaFe |
| Magnetic layer thickness | | 0.10 μm | 0.10 μm | 0.10 μm | 0.10 μm | 0.10 μm |
| Non-magnetic layer thickness | | 0.40 μm | 0.40 μm | 0.40 μm | 0.40 μm | 0.40 μm |
| Non-magnetic support thickness | | 4.00 μm | 4.00 μm | 4.00 μm | 4.00 μm | 4.00 μm |
| Back coating layer thickness | | 0.50 μm | 0.20 μm | 0.20 μm | 0.20 μm | 0.20 μm |
| Back coating layer forming composition | Ratio of inorganic powder/carbon black | 80.0/20.0 | 80.0/20.0 | 80.0/20.0 | 80.0/20.0 | 80.0/20.0 |
| | Stearic acid/part | 2.0 | 2.0 | 3.0 | 4.0 | 2.0 |
| | Stearic acid amide/part | 0.2 | 0.2 | 0.2 | 0.2 | 0.2 |
| | Butyl stearate/part | 1.5 | 1.5 | 1.5 | 1.5 | 1.5 |
| Back coating layer formation conditions | Cooling zone staying time | None | None | None | None | 180 sec |
| | Vibration imparting conditions | None | None | None | None | None |
| Back coating layer | Surface part C—H derived C concentration | 25 atom % | 25 atom % | 27 atom % | 28 atom % | 60 atom % |
| | Difference ($S_{after} - S_{before}$) | 2.0 nm | 2.0 nm | 2.0 nm | 2.0 nm | 2.0 nm |
| | FWHM$_{before}$ | 13.0 nm | 13.0 nm | 13.0 nm | 13.0 nm | 13.0 nm |
| | FWHM$_{after}$ | 8.0 nm | 8.0 nm | 8.0 nm | 8.0 nm | 8.0 nm |
| PES (temperature of 13° C., relative humidity of 80%) | | 58 nm | 97 nm | 94 nm | 93 nm | 87 nm |

| | | Comparative Example 6 | Comparative Example 7 | Comparative Example 8 | Comparative Example 9 |
|---|---|---|---|---|---|
| Ferromagnetic powder | | BaFe | BaFe | BaFe | BaFe |
| Magnetic layer thickness | | 0.10 μm | 0.10 μm | 0.10 μm | 0.10 μm |
| Non-magnetic layer thickness | | 0.40 μm | 0.40 μm | 0.40 μm | 0.40 μm |
| Non-magnetic support thickness | | 4.00 μm | 4.00 μm | 4.00 μm | 4.00 μm |
| Back coating layer thickness | | 0.20 μm | 0.20 μm | 0.20 μm | 0.20 μm |
| Back coating layer forming composition | Ratio of inorganic powder/carbon black | 80.0/20.0 | 80.0/20.0 | 80.0/20.0 | 0/100.0 |
| | Stearic acid/part | 2.0 | 2.0 | 2.0 | 2.0 |
| | Stearic acid amide/part | 0.2 | 0.2 | 0.2 | 0.2 |
| | Butyl stearate/part | 1.5 | 0 | 3.5 | 1.5 |
| Back coating layer formation conditions | Cooling zone staying time | None | 180 sec | 180 sec | 180 sec |
| | Vibration imparting conditions | Vibration imparting time: 2.0 seconds Vibration frequency: 30 kHz Strength: 100 W | Vibration imparting time: 2.0 seconds Vibration frequency: 30 kHz Strength: 100 W | Vibration imparting time: 2.0 seconds Vibration frequency: 30 kHz Strength: 100 W | Vibration imparting time: 2.0 seconds Vibration frequency: 30 kHz Strength: 100 W |
| Back coating layer | Surface part C—H derived C concentration | 25 atom % | 60 atom % | 60 atom % | 60 atom % |
| | Difference ($S_{after} - S_{before}$) | 2.0 nm | 0 nm | 9.0 nm | 2.0 nm |
| | FWHM$_{before}$ | 2.0 nm | 8.0 nm | 2.0 nm | 2.0 nm |
| | FWHM$_{after}$ | 8.0 nm | 8.0 nm | 8.0 nm | 13.0 nm |
| PES (temperature of 13° C., relative humidity of 80%) | | 89 nm | Unevaluable | Unevaluable | 78 nm |

With the comparison of Comparative Example 1 and other Comparative Examples shown, it can be confirmed that the running stability is significantly deteriorated (the PES exceeds 70 nm) in the low temperature and high humidity environment, in the magnetic tape including the back coating layer having a thickness of equal to or smaller than 0.20 µm.

In contrast, it was confirmed that although the magnetic tapes of Examples 1 to 9 include the back coating layer having a thickness of equal to or smaller than 0.20 µm, the PES was equal to or smaller than 70 nm and excellent running stability was obtained.

Reference Experiment: Confirmation of Contribution of Fatty Acid and Fatty Acid Amide with Respect to Surface Part C—H Derived C Concentration (1) Two magnetic tapes (sample tapes) were manufactured by the same method as that in Example 1. The measurement regarding one sample tape was performed by the ESCA device, and then, the solvent extraction of the other sample tape was performed in a non-measured state (solvent: methanol).

When the quantity of fatty acid, fatty acid amide, and fatty acid ester in the solution obtained by the extraction was determined by gas chromatography analysis, a difference in the quantitative values of fatty acid (stearic acid) and fatty acid amide (stearic acid amide) in the two sample tapes was not obtained. Meanwhile, the quantitative value of fatty acid ester (butyl stearate) in the sample tape after the measurement was a value which is significantly lower than the quantitative value thereof in the non-measured sample tape. This is because fatty acid ester is volatilized in a vacuum chamber in which a measurement target sample is disposed during the measurement in the ESCA device.

From the results described above, it is possible to determine that fatty acid ester does not affect the surface part C—H derived C concentration acquired by the analysis performed by ESCA.

(2) Among the components included in the back coating layer forming composition, the organic compounds excluding the solvent and polyisocyanate (crosslinked with other components by a process accompanied with the heating) are stearic acid, stearic acid amide, butyl stearate, a vinyl chloride copolymer, a polyurethane resin, and phenylphosphonic acid. Among the components, it is possible to determine that butyl stearate does not affect the surface part C—H derived C concentration from the results (1).

Next, the effect of the vinyl chloride copolymer, the polyurethane resin, and phenylphosphonic acid with respect to the surface part C—H derived C concentration was confirmed by the following method.

Regarding the vinyl chloride copolymer, the polyurethane resin, and phenylphosphonic acid used in Example 1, C1s spectra were acquired by the same method as that described above, and regarding the acquired spectra, peak resolution of a peak positioned at the vicinity of bonding energy 286 eV and a C—H peak was performed by the process described above. A percentage (peak area ratio) of the separated peak occupying the C1s spectra was calculated, and the peak area ratio of the peak positioned at the vicinity of bonding energy 286 eV and the C—H peak was calculated.

Then, in the C1s spectra acquired in Example 1, the peak resolution of the peak positioned at the vicinity of bonding energy 286 eV was performed by the process described above. The vinyl chloride copolymer, the polyurethane resin, and phenylphosphonic acid have the peak positioned at the vicinity of bonding energy 286 eV in the C1s spectra, whereas fatty acid (stearic acid) and fatty acid amide (stearic acid amide) do not have a peak at the position described above. Accordingly, it is possible to determine that the peak positioned at the vicinity of bonding energy 286 eV of the C1s spectra acquired in Example 1 is derived from the vinyl chloride copolymer, the polyurethane resin, and phenylphosphonic acid. Then, when an amount of contribution of the vinyl chloride copolymer, the polyurethane resin, and phenylphosphonic acid of the C—H peak of the C1s spectra acquired in Example 1 was calculated from the peak area ratio calculated as described above, by using this peak, the amount of contribution thereof was approximately 10%. From this result, it is possible to determine that a large amount (approximately 90%) of the C—H peak of the C1s spectra acquired in Example 1 is derived from fatty acid (stearic acid) and fatty acid amide (stearic acid amide).

From this result, it was confirmed that the surface part C—H derived C concentration can be an index of the presence amount of fatty acid and fatty acid amide.

An aspect of the invention can be effective in the technical fields of magnetic tapes such as back-up tapes.

What is claimed is:

1. A magnetic tape comprising:
   a non-magnetic support;
   a magnetic layer including ferromagnetic powder and a binder on one surface side of the non-magnetic support; and
   a back coating layer including non-magnetic powder and a binder on the other surface side,
   wherein a thickness of the back coating layer is equal to or smaller than 0.20 µm,
   the back coating layer includes one or more components selected from the group consisting of fatty acid and fatty acid amide and fatty acid ester,
   a C—H derived C concentration calculated from a C—H peak area ratio of C1s spectra obtained by X-ray photoelectron spectroscopic analysis performed on the surface of the back coating layer at a photoelectron take-off angle of 10 degrees, is equal to or greater than 35 atom %,
   a full width at half maximum of spacing distribution measured by optical interferometry regarding the surface of the back coating layer before performing a vacuum heating with respect to the magnetic tape is greater than 0 nm and equal to or smaller than 10.0 nm,
   a full width at half maximum of spacing distribution measured by optical interferometry regarding the surface of the back coating layer after performing the vacuum heating with respect to the magnetic tape is greater than 0 nm and equal to or smaller than 10.0 nm, and
   a difference $S_{after}-S_{before}$ between a spacing $S_{after}$ measured by optical interferometry regarding the surface of the back coating layer after performing the vacuum heating with respect to the magnetic tape and a spacing $S_{before}$ measured by optical interferometry regarding the surface of the back coating layer before performing the vacuum heating with respect to the magnetic tape is greater than 0 nm and equal to or smaller than 8.0 nm.

2. The magnetic tape according to claim 1, wherein the C—H derived C concentration is 35 atom % to 60 atom %.

3. The magnetic tape according to claim 1, wherein the C—H derived C concentration is 40 atom % to 60 atom %.

4. The magnetic tape according to claim 1, wherein the full width at half maximum of spacing distribution measured by optical interferometry regarding the surface of the back coating layer before performing a vacuum heating with respect to the magnetic tape is greater than 0 nm and equal to or smaller than 8.0 nm.

5. The magnetic tape according to claim 1,
wherein the full width at half maximum of spacing distribution measured by optical interferometry regarding the surface of the back coating layer after performing a vacuum heating with respect to the magnetic tape is greater than 0 nm and equal to or smaller than 8.0 nm.

6. The magnetic tape according to claim 1,
wherein the difference $S_{after}-S_{before}$ is greater than 0 nm and equal to or smaller than 6.0 nm.

7. The magnetic tape according to claim 1,
wherein the thickness of the back coating layer is 0.05 μm to 0.20 μm.

8. The magnetic tape according to claim 2,
wherein the full width at half maximum of spacing distribution measured by optical interferometry regarding the surface of the back coating layer before performing a vacuum heating with respect to the magnetic tape is greater than 0 nm and equal to or smaller than 8.0 nm.

9. The magnetic tape according to claim 2,
wherein the full width at half maximum of spacing distribution measured by optical interferometry regarding the surface of the back coating layer after performing a vacuum heating with respect to the magnetic tape is greater than 0 nm and equal to or smaller than 8.0 nm.

10. The magnetic tape according to claim 2,
wherein the difference $S_{after}-S_{before}$ is greater than 0 nm and equal to or smaller than 6.0 nm.

11. The magnetic tape according to claim 2,
wherein the thickness of the back coating layer is 0.05 μm to 0.20 μm.

12. The magnetic tape according to claim 3,
wherein the full width at half maximum of spacing distribution measured by optical interferometry regarding the surface of the back coating layer before performing a vacuum heating with respect to the magnetic tape is greater than 0 nm and equal to or smaller than 8.0 nm.

13. The magnetic tape according to claim 3,
wherein the full width at half maximum of spacing distribution measured by optical interferometry regarding the surface of the back coating layer after performing a vacuum heating with respect to the magnetic tape is greater than 0 nm and equal to or smaller than 8.0 nm.

14. The magnetic tape according to claim 3,
wherein the difference $S_{after}-S_{before}$ is greater than 0 nm and equal to or smaller than 6.0 nm.

15. The magnetic tape according to claim 3,
wherein the thickness of the back coating layer is 0.05 μm to 0.20 μm.

16. The magnetic tape according to claim 1,
wherein the non-magnetic powder included in the back coating layer is one or more kinds of non-magnetic powder selected from the group consisting of inorganic powder and carbon black.

17. The magnetic tape according to claim 16,
wherein the content of the inorganic powder in the back coating layer is in a range of greater than 50.0 parts by mass to equal to or less than 100.0 parts by mass with respect to 100.0 parts by mass of the total content of the non-magnetic powder included in the back coating layer.

18. The magnetic tape according to claim 1, further comprising:
a non-magnetic layer including non-magnetic powder and a binder between the non-magnetic support and the magnetic layer.

* * * * *